(12) United States Patent
Ito et al.

(10) Patent No.: US 7,725,694 B2
(45) Date of Patent: May 25, 2010

(54) PROCESSOR, MICROCOMPUTER AND METHOD FOR CONTROLLING PROGRAM OF MICROCOMPUTER

(75) Inventors: Naoki Ito, Nukata-gun (JP); Masahiro Kamiya, Nishio (JP); Hideaki Ishihara, Okazaki (JP); Akimasa Niwa, Kiyosu (JP); Takayuki Matsuda, Kariya (JP); Toshihiko Matsuoka, Nukata-gun (JP)

(73) Assignee: DENSO CORPORATION, Kariya (JP)

( * ) Notice: Subject to any disclaimer, the term of this patent is extended or adjusted under 35 U.S.C. 154(b) by 113 days.

(21) Appl. No.: 11/312,830

(22) Filed: Dec. 21, 2005

(65) Prior Publication Data

US 2006/0155976 A1 Jul. 13, 2006

(30) Foreign Application Priority Data

| Dec. 21, 2004 | (JP) | ............................ 2004-368777 |
| Feb. 28, 2005 | (JP) | ............................ 2005-053050 |
| Apr. 27, 2005 | (JP) | ............................ 2005-130382 |

(51) Int. Cl.
   *G06F 9/00* (2006.01)
(52) U.S. Cl. ...................... 712/234; 712/220; 712/236; 712/226
(58) Field of Classification Search ................. 712/220, 712/226, 234, 236, E9.05
   See application file for complete search history.

(56) References Cited

U.S. PATENT DOCUMENTS

| 3,577,190 | A  * | 5/1971  | Cocke et al. ................. 712/226 |
| 5,634,047 | A  * | 5/1997  | Getzlaff et al. ............... 712/241 |
| 6,055,619 | A  * | 4/2000  | North et al. .................... 712/36 |
| 6,304,957 | B1 * | 10/2001 | Ishihara et al. ............... 712/228 |
| 6,516,407 | B1 * | 2/2003  | Suga et al. ................... 712/226 |
| 6,880,029 | B2 * | 4/2005  | Tomita ........................ 710/260 |
| 6,934,941 | B2 * | 8/2005  | Kamiya et al. ............... 717/153 |
| 2002/0002670 | A1 * | 1/2002 | Yoshida et al. .............. 712/245 |

(Continued)

FOREIGN PATENT DOCUMENTS

JP  A-61-221939  10/1986

(Continued)

OTHER PUBLICATIONS

A Hwang Lee Scott, J. Moyer, B. Arends, J. "Low-cost branch folding for embedded applications with small tightloops"; This paper appears in: Microarchitecture, 1999. MICRO-32. Proceedings. 32nd Annual International Symposium on; Publication Date: 1999; On pp. 103-111.*

(Continued)

*Primary Examiner*—Eddie P Chan
*Assistant Examiner*—Idriss N Alrobaye
(74) *Attorney, Agent, or Firm*—Posz Law Group, PLC

(57) ABSTRACT

A microcomputer includes a CPU capable of performing a plurality of tasks in a parallel time-sharing operation. The tasks include at least one special task having a fixed loop program with a constant increase of an instruction address. When the CPU performs a conditional judgment instruction in the special task, the CPU prohibits reflecting an execution result of the conditional judgment instruction to both of the CPU and a periphery circuit in a case where it is no need to perform an instruction described in the special task after the conditional judgment instruction.

9 Claims, 23 Drawing Sheets

U.S. PATENT DOCUMENTS

| | | | |
|---|---|---|---|
| 2004/0010777 A1* | 1/2004 | Klein | 717/127 |
| 2004/0039901 A1* | 2/2004 | Kudo | 712/237 |
| 2005/0028036 A1* | 2/2005 | Shibata | 714/38 |
| 2005/0289331 A1 | 12/2005 | Watt | |
| 2006/0036833 A1 | 2/2006 | Piry et al. | |
| 2006/0117167 A1 | 6/2006 | Evrard et al. | |
| 2006/0155962 A1 | 7/2006 | Piry | |

FOREIGN PATENT DOCUMENTS

| | | |
|---|---|---|
| JP | A-H03-269728 | 12/1991 |
| JP | A-2001-243205 | 9/2001 |
| JP | A-2002-082800 | 3/2002 |
| JP | B2-3335735 | 8/2002 |

OTHER PUBLICATIONS

Office Action dated Sep. 29, 2009 from Japan Patent Office in corresponding JP application No. 2005-130382 (and English translation).

* cited by examiner

```
ADDR        DATA                        219
      int:
200         nop        ←                VIIIA
201         nop        ←                VIIIB
202         nop        ←                VIIIC
203         nop        ←                VIIID
204         add.b   #-4, sp
205         mov.w   r13,@(0, sp)
206         mov.w   r12,@(2, sp)
             .          .
             .          .
             .          .
```

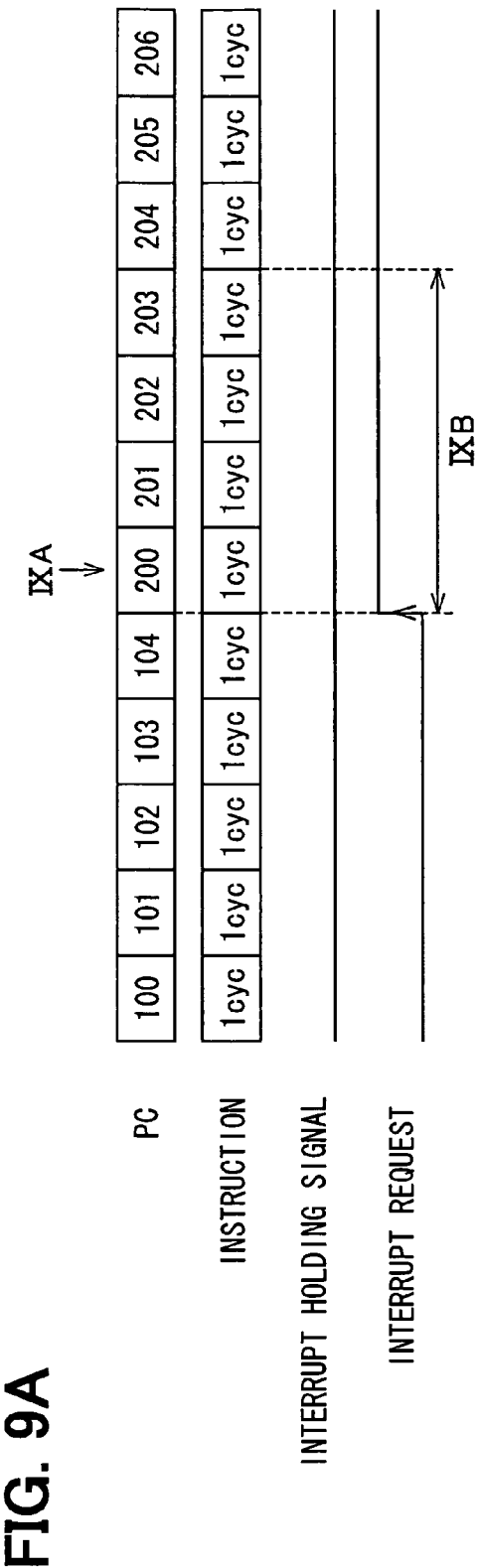
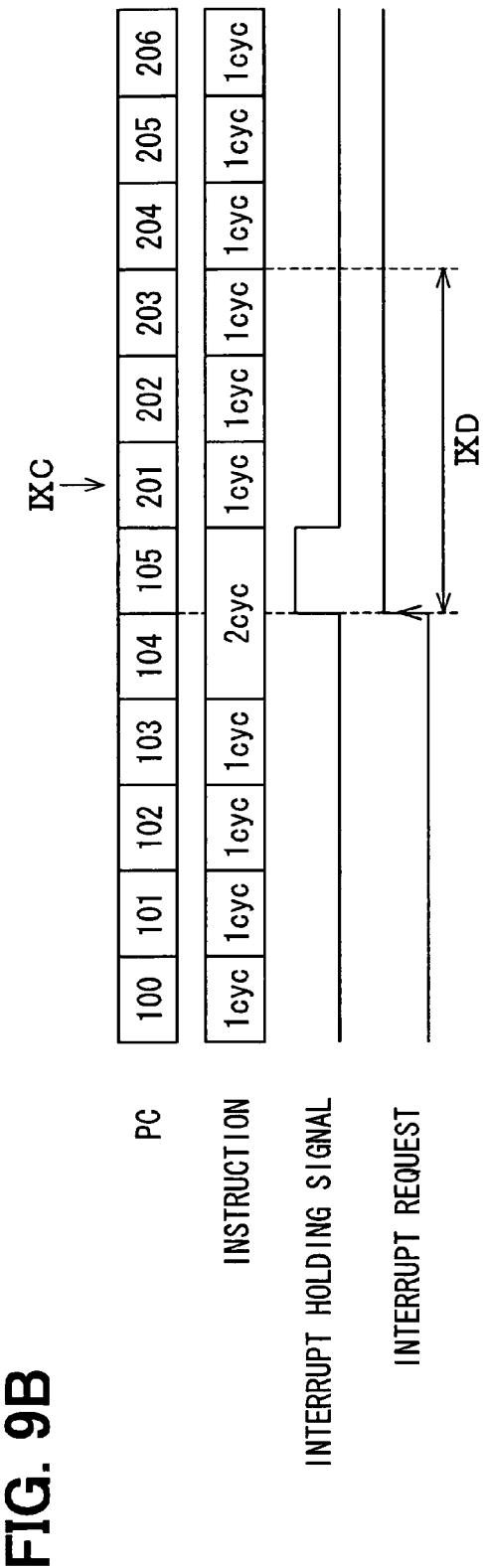
FIG. 9A
FIG. 9B

FIG. 12

```
ADDR        DATA                        ~220A
            int:
200         nop
201         add.b    #-4, sp
202         mov.w    r13, @(0, sp)
203         mov.w    r12, @(2, sp)
 .           .
 .           .
 .           .
```

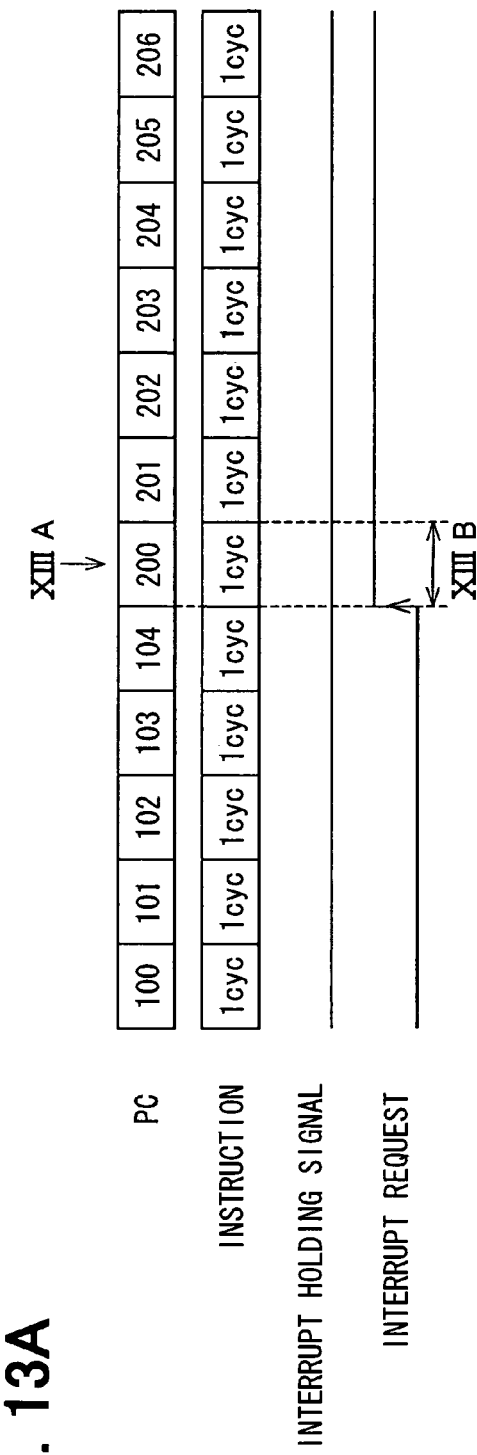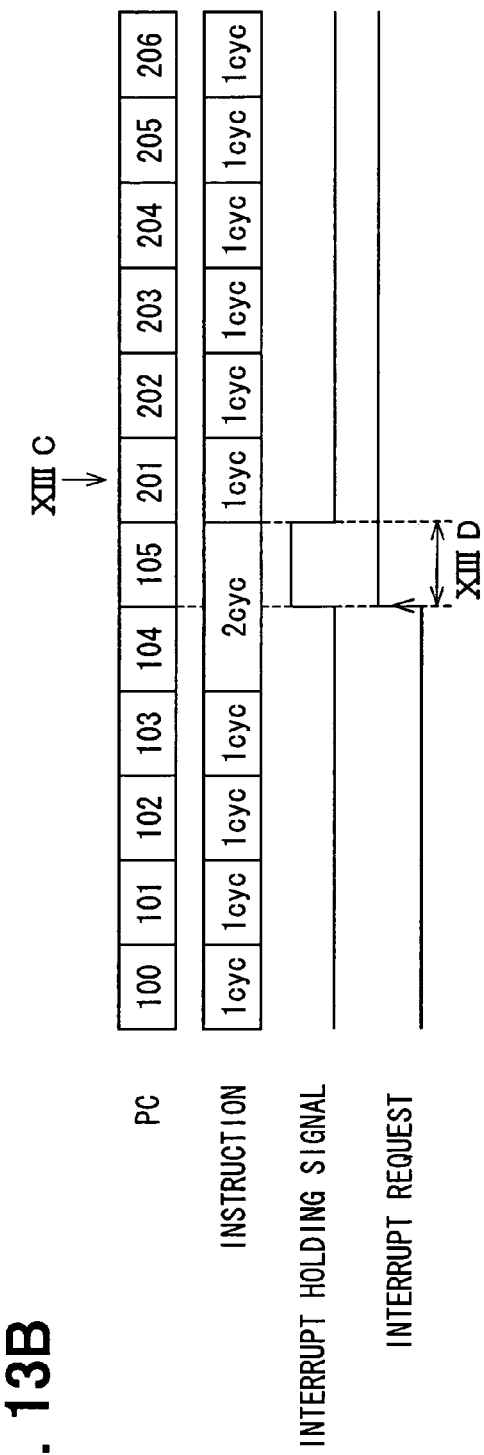

US 7,725,694 B2

PROCESSOR, MICROCOMPUTER AND METHOD FOR CONTROLLING PROGRAM OF MICROCOMPUTER

CROSS REFERENCE TO RELATED APPLICATIONS

This application is based on Japanese Patent Applications No. 2004-368777 filed on Dec. 21, 2004, No. 2005-53050 filed on Feb. 28, 2005, and No. 2005-130382 filed on Apr. 27, 2005, the disclosures of which are incorporated herein by reference.

FIELD OF THE INVENTION

The present invention relates to a processor, a microcomputer and a method for controlling a program of the microcomputer.

BACKGROUND OF THE INVENTION

An arrangement of a microcomputer shown in FIG. 5 is disclosed in JP-A-6-250857, which corresponds to U.S. Pat. No. 6,304,957-B1. The microcomputer is arranged by employing a CPU (Central Processing Unit) 11, a program memory 12 constructed of a ROM (Read-Only Memory), a data memory 13 constructed of a RAM (Random Access Memory), an I/O (Input/Output) block (pin) 14, a timing generator (not shown) for generating a CPU switching signal (clock signal) which will be explained later, a data bus 15 for transmitting/receiving data, an address bus 15 for transmitting/receiving an address signal, and a control bus 17 for transmitting/receiving a read signal, and also, another control bus 18 for transmitting/receiving a write signal.

The above-described CPU 11 is provided with two address registers 19 and 20, and two operation registers 21 and 22 in order to pipeline-process, for example, two sorts of tasks (namely, L task and A task) in a time divisional manner and a parallel mode. Since these address registers 19 and 20, and also, these operation registers 21 and 22 are alternately switched in response to a CPU switching signal, this CPU 11 may outwardly function in such a way that two pieces of CPUs are alternately switched.

In this case, both one address register 19 and one operation register 21 constitute registers used for a CPU0 (namely, for L task), whereas both the other address register 20 and the other operation register 22 constitute registers used for another CPU1 (namely, for A task). In response to switching of these address registers 19 and 20, a value (namely, address of instruction which is fetched next time) of a program counter 23 is updated, and thus, an address signal for the CPU0 (for L task) and another address signal for the CPU1 (for A task) are alternately outputted from this program counter 23 to the program memory 12.

Also, an error detecting circuit 24, and an instruction decoder/instruction sequencer 25 are provided in the CPU 11. The error detecting circuit 24 judges a sort of a task, to which an instruction read out from the program memory 12 belongs so as to detect an error contained in this judged task. The instruction decoder/instruction sequencer 25 decodes an instruction which has passed through the error detecting circuit 24. In response to a content of an instruction decoded by this instruction decoder/instruction sequencer 25, a calculation is executed in a calculator (ALU) 26 by employing the operation registers 21 and 22, and either a read signal or a write signal is outputted to the control buses 17 and 18.

On the other hand, both a program area 27 for the CPU0 (for L task), another program area 28 for the CPU1 (for A task), and a table immediate data area 29 have been provided in the program memory 12. In this case, an L task stored in the program area 27 for the CPU0 has been constituted by such a program which has been fix-looped and by which a branch instruction having a risk to be brought into a program runaway is prohibited. As a consequence, when a program of an L task is executed, an execution of an instruction is started from an address "0", and then, instructions are sequentially executed from an address "1", via an address "2", an address "3", and so on, and thereafter, when the instructions are executed at a predetermined address, the program counter 23 is brought into an overflow state, and then, is returned to the address "0." Subsequently, the instructions are repeatedly executed in accordance with the above-described address sequence. Also, all of instructions contained in this L task have been fixed to one word.

The L task is suitable to execute a sequential control process operation, and the program for constituting this L task contains a routine for monitoring a runaway (i.e., malfunction) of the A task, and another routine for a backup sequence used to establish a fail safe of the system. Furthermore, this L task is also equipped with a function as a timer by a fixed loop operation. For instance, when either an increment instruction or a decrement instruction is executed, so that the count value thereof is reached to a predetermined preset value, since an interrupt is produced in a process operation of an A task, this L task can realize a constant time process operation equivalent to a timer interrupt.

On the other hand, in the A task, a branch instruction, which is prohibited in the L task, is also allowed, and this A task is suitable for, for example, a complex analyzing process operation/numeral value processing operation. Similar to the above-described L task, all of instructions of this A task have been fixed to one word instruction. Both op-codes and operands (addresses) have been allocated within one word.

Next, a pipeline control system which is employed by the microcomputer having the above-explained arrangement will now be explained with reference to FIG. 6. This pipeline has been arranged as three stages of pipelines which are made of, for example, an instruction fetch stage, an instruction decode stage, and an instruction execute stage, and has been designed in such a manner that all of these instructions can be processed without any delay by the three stages of pipelines. Each of these three stages is executed within one cycle, and thus, one instruction is executed in three cycles. However, three instructions are processed in a parallel mode by the stages of pipelines, which may outwardly be equivalent to such a fact that one instruction is executed within one cycle.

A time required for one cycle (each stage) has been defined by a CPU switching signal (clock signal). As to this CPU switching signal, a time "TLo" of a low level is equal to a time "THi" of a high level. In the low level period, an instruction fetch of the CPU0 (L task) is executed, whereas in the high level period, and an instruction fetch of the CPU1 (A task) is executed, so that both the program of the CPU0 (L task) and the program of the CPU1 (A task) are pipeline-processed in a parallel mode in such a time divisional ratio of 1:1.

In addition, when the CPU1 fetches a branch instruction contained in the program of the A task, in order to fetch an instruction of a branch destination address in the next instruction fetch stage of the A task into which this fetched branch instruction is contained, the CPU 1 has been arranged in such a manner that the branch destination address is set in the instruction decode stage. FIG. 6 represents process timing in such a case that while a pipeline process operation is carried out, an instruction of the CPU1 at an address (Y+1) corresponds to a branch instruction (JMP) to an address (YY).

The CPU 11 has been equipped with the plurality of address registers 19 and 20, and the plurality of operation registers 21 and 22. These plural address registers 19 and 20 sequentially set different instruction addresses to the program counter 23. The plural operation registers 21 and 22 sequentially set instructions decoded by the instruction decoder/instruction sequencer 25 to the calculator 26. The CPU 11 has been arranged so as to be capable of pipeline-processing the plural programs 27 and 28 stored in the program memory 12 by sequentially switching the plural address registers 19 and 20, and the plural operation registers 21 and 22.

As previously described, in the microcomputer, since the execution of the branch instruction is prohibited (namely, description of branch instruction in program is prohibited) in the L task, the count value of the program counter 23 is always incremented by "1" (in this case, count value of program counter 23 has been set in above-described manner irrespective of byte number of one instruction), and thus, the L task can realize the runaway monitoring process operation on the side of the A task, and the timer function utilizing the count value of the program counter 23.

However, since such a restriction for prohibiting the branch instruction is given to the side of the L task, the branching process operation cannot be executed on the side of the L task. As a result, there is such a problem that, for instance, a conditional control flow cannot be executed on the L task side, while this conditional control flow selects as to whether or not a predetermined calculating process operation can be carried out in response to a result of executing a predetermined condition judgement.

Further, in microcomputers, there are such application programs capable of executing process operations in a time constant manner by utilizing interrupt process operations. For instance, in communication process operations, exclusively-used communication control blocks are mounted in order to secure time constant systems of communication speeds. In this connection, the Inventors of the present invention have supposed that, instead of the employment of the above-explained communication control blocks, desirable communications are realized by employing both a timer interrupt process operation and a software process operation. If the desirable communications can be realized by these timer interrupt and software process operations, then the above-described communication control blocks are no longer mounted and microcomputers can be constructed in low cost.

However, in this case, there is a problem how to realize the above-explained time constant process operation. That is to say, the timer interrupt must be executed without any shift of even one cycle. If the timer interrupt is shifted only for even one cycle, then an adverse influence may be produced as a communication speed error. On the other hand, since execution times of various sorts of instructions which are executed by a CPU may be different from each other, if an interrupt request is issued in a halfway while such an instruction whose execution time is longer than that of another instruction is executed, there are some cases that a commencement of an interrupt process operation is held.

In other words, as indicated in FIG. 14A, for instance, while all of instructions are executed in the unit of one cycle, if an interrupt request is issued in such a case that a value (instruction fetch address) of a program counter is sequentially incremented by "1", then this interrupt request is not held, but an interrupt process operation is immediately commenced from a head address "200." To the contrary, as shown in FIG. 14B, if an interrupt request is issued in a half way while an instruction, whose execution time is equal to two cycles, is carried out, then this interrupt request is held for one cycle, so that start timing of the interrupt process operation is delayed.

For example, such a programmable controller is disclosed in JP-A-2001-265412, which corresponds to U.S. Pat. No. 6,880,029. That is, in this programmable controller, a normal process operation (user program executing process operation, I/O refreshing process operation) is executed in a cyclic manner, and also, an interrupt trigger is generated in a predetermined time period. Then, the execution of the user program executing process operation is interrupted at the timing when this interrupt trigger is generated, and a peripheral service process operation is carried out only by a determined amount.

However, in accordance with the conventional technique, in such a case that the interrupt process operation is held, it is not possible to avoid such a fact that the execution start timing of the peripheral service processing operation is shifted. In other words, the conventional technique never supposes, or expects such a strict time management capable of avoiding that the execution start timing is shifted by one cycle.

Furthermore, as systems for controlling condition branches of programs in CPUs (processors), conventionally, the below-mentioned two systems have been proposed:

(i) A control system in which, while a conditional branch instruction and the like are contained in an instruction set, when a condition can be established, a process operation jumps to a designated address.

(ii) A system in which, while a skip instruction is contained in an instruction set, either one instruction or a plurality of continuous instructions are invalidated which are provided immediately after the skip instruction. Such a technical idea for causing an instruction to be brought into a non-operation state when a process operation skips has been described in, for instance, JP-A-61-221939.

In any of the above-described condition branch control systems (i) and (ii), a total execution cycle number when a condition can be established is different from a total execution cycle number when a condition cannot be established. As a result, there is such a problem that in a program and a system thereof in which execution timing of an instruction is important, such instructions after a branching process operation (namely, after skipping process operation in combination with non-operation treatment of instruction) cannot be executed at the same cycle timing.

For example, in the above-described condition branch control system (ii), the above-described problem corresponds to a load/store instruction having such a data size which exceeds a bus width, namely, a plurality of cycles are required so as to execute such a load/store instruction, which may cause the above-explained problem.

SUMMARY OF THE INVENTION

In view of the above-described problem, it is an object of the present invention to provide a processor, a microcomputer and a method for controlling program of a microcomputer.

A microcomputer includes a CPU capable of performing a plurality of tasks in a parallel time-sharing operation. The tasks include at least one special task having a fixed loop program with a constant increase of an instruction address. When the CPU performs a conditional judgement instruction in the special task, the CPU prohibits reflecting an execution result of the conditional judgement instruction to both of the CPU and a periphery circuit in a case where it is no need to perform an instruction described in the special task after the conditional judgement instruction.

In the above microcomputer, even when the execution of the instruction described after the special task is not needed to perform, the CPU executes the unnecessary instruction seemingly. Accordingly, the value of the program counter in case of the special task increases, similar to a case where the instruction is needed to perform. Further, the process time in case of the special task advances, similar to a case where the instruction is needed to perform. However, since the CPU prohibits reflecting the execution result of the conditional judgement instruction to both of the CPU and a periphery circuit, practically, the instruction after the conditional judgement instruction is not performed.

Accordingly, without depending on the judgement result of the conditional judgement instruction, the increase of the instruction address becomes constant. Further, the execution time, i.e., the process time of the instruction becomes constant. Thus, even when the special task is executed, the conditional branch process can be realized with maintaining the process time constant. Thus, the degree of freedom in the program is improved. Specifically, the microcomputer is capable of executing a plurality of tasks in a time divisional manner and in a parallel mode, among which at least one task constitutes a specific task where a program is described and has been fix-looped in such a manner that increased addresses of instruction addresses become constant.

Preferably, when the instruction described in the special task after the conditional judgement instruction, which is not necessitated to perform, is a load instruction, the CPU prohibits writing a data in an inner register, and the data is read out by execution of the load instruction. In this case, the execution result of the load instruction is not reflected to the CPU, so that the load instruction is not performed practically.

Preferably, when the instruction described in the special task after the conditional judgement instruction, which is not necessitated to perform, is a load instruction, the CPU cancels the load instruction in such a manner that a data is replaced to a predetermined value in the inner register so as to write the predetermined value in the inner register when the data read out by execution of the load instruction is to be written in the inner register. In this case, the execution result of the load instruction is not reflected to the CPU, so that the load instruction is not performed practically.

Preferably, when the instruction described in the special task after the conditional judgement instruction, which is not necessitated to perform, is a store instruction, the CPU converts an operand address in the store instruction to a dummy address so that the CPU outputs the dummy address. The dummy address has no object, in which a data is to be written, and the periphery circuit returns an acknowledge signal to the CPU when execution of the dummy address provides to access the periphery circuit. In this case, since the periphery circuit of the CPU returns the acknowledge signal on the basis of the access of the dummy address, no bus error occurs. Further, the execution result of the store instruction is not reflected to the periphery circuit. Accordingly, the store instruction is not performed practically.

More preferably, when the operand address in the store instruction is converted to the dummy address, each low-order bit by a predetermined number of the low-order bits in the operand address is converted to "1." In this case, in the address region corresponding to the periphery circuit, which is an operand address object of writing, the object of writing is disposed between the top of the address region and the predetermined portion. The address region after the predetermined portion is assigned to the dummy address corresponding portion. Thus, by maintaining the upper bits of the operand address without replacing, and by converting the lower bits to "1," the CPU can access the dummy address region, which is disposed in the low bit side of the address region.

Further, a microcomputer includes: a memory for memorizing a control program; and a CPU. The CPU includes: a decoder for decoding an instruction fetched from the memory; an execution portion for executing a decoded instruction decoded by the decoder; and an interrupt control portion for controlling an interrupt. The control program includes an interrupt program to insert at least one no-operation instruction between a top instruction and a last instruction just before an interrupt start instruction. The execution portion in the CPU outputs an interrupt hold signal in accordance with a time difference obtained by subtracting an execution time of a predetermined general instruction from an execution time of a special instruction when the execution time of the special instruction is equal to or longer than that of the predetermined general instruction. The interrupt control portion in the CPU increases a fetch address in an instruction corresponding to the interrupt program in accordance with an outputting time of outputting the interrupt holding signal when the interrupt holding signal is outputted at a time point of occurrence of an interrupt request.

In the above microcomputer, when the occurred interrupt request process is not held, the time from the time point of occurrence of the interrupt request to the start time point of the interrupt process is determined in accordance with the number of NOP instructions from the top of the interrupt process program. When the interrupt request is occurred during the CPU executes the special instruction so that the interrupt request process is held, the fetch address of the instruction is increased in accordance with the time interval of holding of the interrupt control portion. Accordingly, the execution of the NOP instructions is skipped by the increase of the fetch address. Thus, the time interval from the time point of occurrence of the interrupt request to the starting time point of the interrupt process in case of holding of the interrupt control portion becomes the same as a case of not holding of the interrupt control portion. Thus, the execution time, i.e., the process time of the interrupt process becomes constant. Specifically, punctuality of the interrupt process is secured in cycle base. Specifically, the microcomputer is capable of executing the timer interrupt process operation without any shift of even 1 cycle.

Further, a processor includes: a skip process control means for canceling at least one instruction after a conditional judgement instruction when a condition in the conditional judgement instruction is satisfied. The skip process control means prohibits writing a data in the processor or a periphery circuit during a skip process of the skip process control means.

In the above processor, even when the instruction is cancelled, the cycles having a predetermined number are executed. The number of the cycles in a case where the instruction is cancelled is the same as the cycles in a case where the instruction is not cancelled. Thus, the execution time of the instruction cycles becomes constant without depending whether the instructions are cancelled or not. Specifically, the processor is capable of making execution cycles of instructions constant irrespective of a fact as to whether these instructions are valid, or invalid.

Preferably, the skip process control means includes a skip state flag for controlling a writing instruction of the data. The conditional judgement instruction is a conditional branch instruction to branch only forwardly, and the skip state flag is set to be a skip state when the condition in the conditional branch instruction is satisfied. More preferably, the skip process control means further includes: a branch destination address register for holding a branch destination address, which is defined by the conditional branch instruction; and address comparing means for comparing the branch destination address in the branch destination address register and a current address in a program counter. The address comparing means sets the skip state flag to be a normal state when the branch destination address is equal to or smaller than the current address. Furthermore preferably, the address comparing means includes a calculation logical operation unit disposed in a data path. When the skip state flag represents the skip state, the branch destination address in the branch destination address register and the current address in the program counter are inputted to the calculation logical operation unit. The calculation logical operation unit outputs a condition code on the basis of inputting of the branch destination address and the current address. When the condition code shows that the branch destination address is equal to or smaller than the current address, the skip state flag is set to be the normal state.

Further, a method for controlling a program of a skip process in a processor is provided. The skip process performs to cancel at least one instruction after a conditional judgement instruction when a condition in the conditional judgement instruction is satisfied. The method includes the step of: continuously performing a sequence control of instruction so that only a data writing is prohibited even when the instruction after the conditional judgement instruction is cancelled.

In the above method, the number of the cycles in a case where the instruction is cancelled is the same as the cycles in a case where the instruction is not cancelled. Thus, the execution time of the instruction cycles becomes constant without depending whether the instructions are cancelled or not. Specifically, the program control method is capable of making execution cycles of instructions constant irrespective of a fact as to whether these instructions are valid, or invalid.

BRIEF DESCRIPTION OF THE DRAWINGS

The above and other objects, features and advantages of the present invention will become more apparent from the following detailed description made with reference to the accompanying drawings. In the drawings:

FIG. 9A is a timing chart showing a case where an interrupt request is occurred during execution of a normal instruction, and FIG. 9B is a timing chart showing a case where an interrupt request is occurred during execution of two cycle special instruction, according to the second embodiment;

FIG. 12 is a program sample showing an interrupt process, according to the third embodiment;

FIG. 13A is a timing chart showing a case where an interrupt request is occurred during execution of a normal instruction, and FIG. 13B is a timing chart showing a case where an interrupt request is occurred during execution of two cycle special instruction, according to the third embodiment;

DETAILED DESCRIPTION OF THE PREFERRED EMBODIMENTS

First Embodiment

Figure 1:
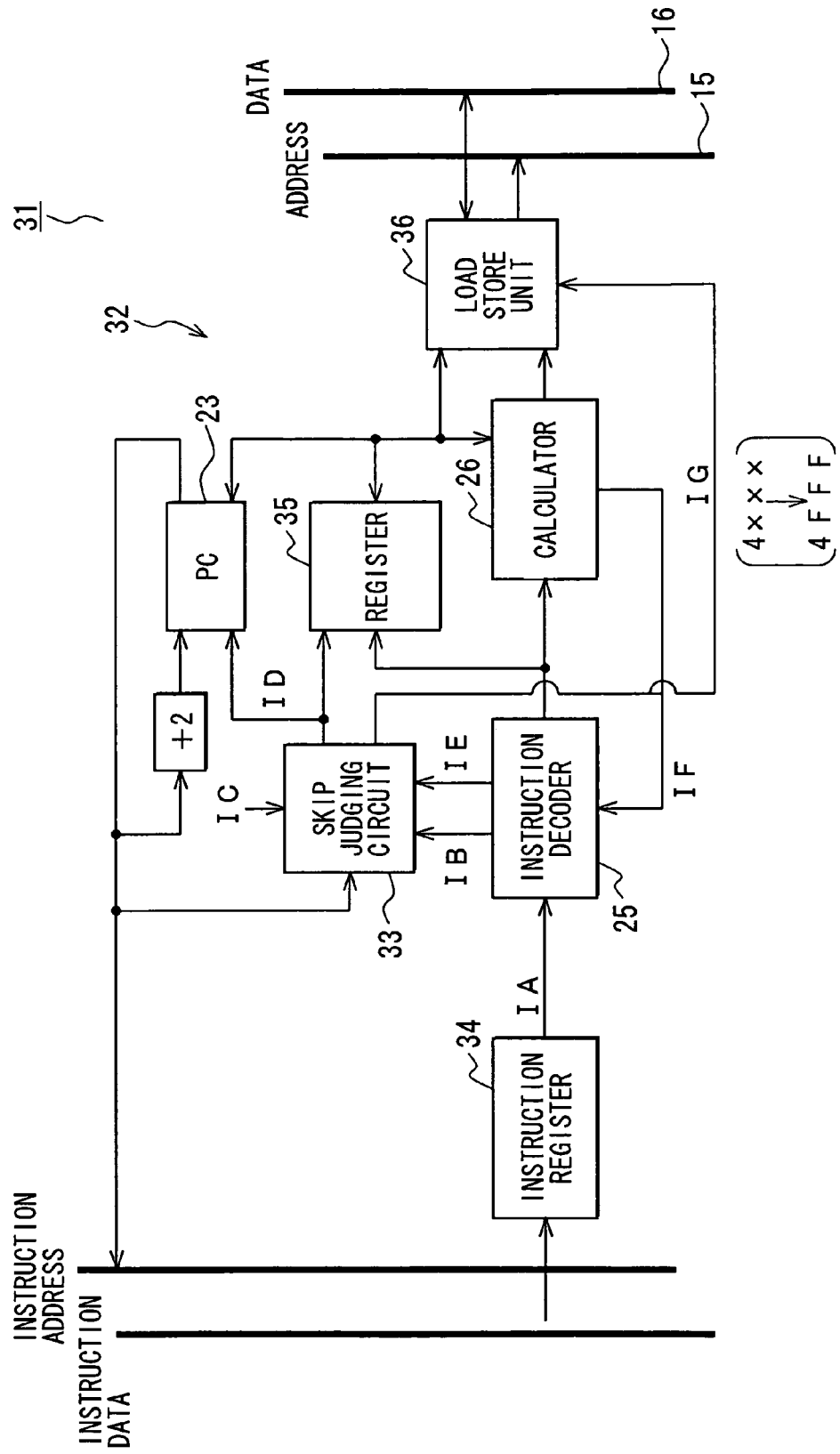
FIG. 1 is a schematic block diagram showing a CPU of a microcomputer according to a first embodiment of the present invention.

Referring now to FIG. 1 to FIG. 4B, a first embodiment of the present invention will be described. FIG. 1 is a functional block diagram for indicating an arrangement of a CPU 32 employed in a microcomputer 31 according to the first embodiment of the present invention. In FIG. 1, IA represents an instruction, IB represents a skip signal, i.e., a branching instruction, IC represents a CPU switching signal, ID represents a write inhibit signal, IE represents a load/store instruction, IF represents a condition judging result, and IG represents a switching signal to a dummy address. It should be understood that although a basic arrangement of the CPU 32 is similar to that of the CPU 11 shown in FIG. 5, only structural portions related to the gist of the present invention are extracted to be indicated in FIG. 1, for the sake of easy illustrations. As a novel structural portion provided in the CPU 32, a skip judging circuit 33 is mainly provided in this CPU 32. It should also be noted that in this embodiment, assuming now that the CPU 32 accesses a two-byte instruction, an increased count value of a program counter 23 is selected to be "2."

To the above-explained skip judging circuit 33, an instruction address outputted from the program counter 23, a CPU switching signal, a branch instruction signal, and a load/store signal are supplied. Both the branch instruction signal and the load/store signal are outputted from an instruction decoder/instruction sequencer (will be simply referred to as "instruction decoder" hereinafter) 25. This instruction decoder 25 is arranged in such a manner that while a decoded instruction corresponds to a branch instruction (including conditional branch instruction), if this branch judgment is established and a condition judging result signal derived from a calculator 26 becomes active, then the instruction decoder 25 outputs a branch instruction signal. As to this branch instruction signal, an active (high) time period is secured only for a branching (step) number designated by the branch instruction.

Also, in the case that a decoded instruction corresponds to either a load instruction or a calculation instruction, the instruction decoder 25 changes the signal level of the load/store signal into a low level, whereas in the case that a decoded instruction corresponds to a store instruction, the instruction decoder 25 changes the signal level of the load/store signal into a high level (in the case of other instructions, instruction decoder 25 maintains signal level).

In such a case that a signal level of a CPU switching signal corresponds to a low level and this CPU switching signal indicates a processing time period of an L task (specific task) of the CPU0, when the instruction decoder 25 decodes an instruction fetched via the instruction register 34 to obtain a decoded result which corresponds to a branch instruction, and also, the instruction decoder 25 outputs a branch instruction signal in the case that a branch judgement can be established, the skip judging circuit 33 recognizes this branch instruction signal as a skip signal. In this case, the skip judging circuit 33 has been arranged as follows: that is, in such a case that an instruction, which is executed when a branch execution condition cannot be established, corresponds to either a load instruction or a calculation instruction, the skip judging circuit 33 outputs a write prohibit signal for a predetermined time period with respect to both the program counter 28 and a (general-purpose) register 35.

Also, while the skip judging circuit 33 recognizes the skip signal, in such a case that an instruction, which is executed when a branch execution condition cannot be established, corresponds to a store instruction, the skip judging circuit 33 similarly outputs a write prohibit signal with respect to both the program counter 23 and the register 35, and also, outputs a dummy address switching signal with respect to an address bus/load store unit 36. Then, the address bus/load store unit 36 has been arranged as follows: that is, when the dummy address switching signal is given to the address bus/load store unit 36, all of lower grade-sided bits of operand addresses of a store instruction, which has been stored thereinto at this time, are converted into "1" only by a predetermined bit number. For example, in such a case that an address corresponds to 16 bits and an access address of a peripheral circuit 38 shown in FIG. 2 corresponds to "0x4XXX", this 16-bit address is converted by the address bus/load store unit 36 in such a manner that this address becomes "0x4FFF" which corresponds to an end of the address area of the peripheral circuit 38.

The register 35 is arranged as follows: that is, in a time period for which the write prohibit signal is active, such a data which is acquired from the peripheral circuit via the load store unit 36 since the load instruction was executed is not stored in the register 35. As a structure for prohibiting a storage of the data obtained from the peripheral circuit, there are two structures: that is, the data storage itself is prohibited; and since the data obtained from the peripheral circuit is replaced by a value of an internal register of a storage destination, the same value is overwritten so as to essentially invalidate the stored value. Also, a storage of such a data which is obtained as a result of such a fact that the calculator 26 executed the calculation instruction is similarly prohibited.

Figure 2:
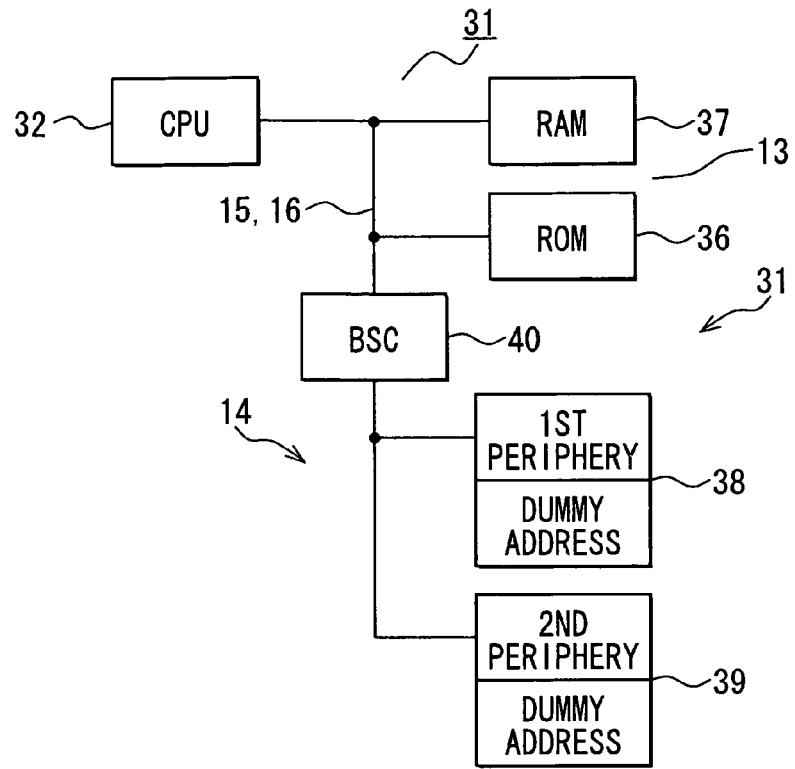
FIG. 2 is a block diagram showing the microcomputer according to the first embodiment.

Also, FIG. 2 is a functional block diagram for schematically indicating an overall structure of the microcomputer 31. In this microcomputer 31, a ROM 41 and a RAM 37 which are provided as a data memory 13 and have been connected via an address bus 15 and a data bus 16 to the CPU 32, and further, a peripheral circuit 38 (first peripheral circuit) another peripheral circuit 39 (second peripheral circuit) which are employed as an I/O block 14 and are connected via a bus state controller (BSC, i.e., an external circuit, or a peripheral circuit) 40. The BSC 40 performs a cycle adjustment (for example, inserts wait cycle), and also, resends an acknowledge signal with respect to the CPU 32 in such a case that the CPU 32 accesses the peripheral circuits 38 and 39, the operating speeds of which are slow.

Also, in the peripheral circuits 38 and 39, the address areas allocated to the respective peripheral circuits 38 and 39 are set in such a way that dummy address areas into which data is not actually written are added to end portions of such areas as internal registers into which data is actually written. Then, the BSC 40 is arranged by that even when the CPU 32 accesses this dummy address area, this BSC 40 resends an acknowledge signal.

It should be understood that when the CPU 32 accesses the peripheral circuits 38 and 39, if the BSC 40 inserts a wait cycle, then an instruction execution stage in a pipeline process operation of the CPU 32 is delayed. However, such an information may be previously grasped when the program is described, in the case that the CPU 32 executes an access operation where a delay occurs in the execution in the L task, the CPU 32 executes a calculation process operation in such a manner that a weight for this delay component is given to an increased value of the program counter 23.

Figure 3A:
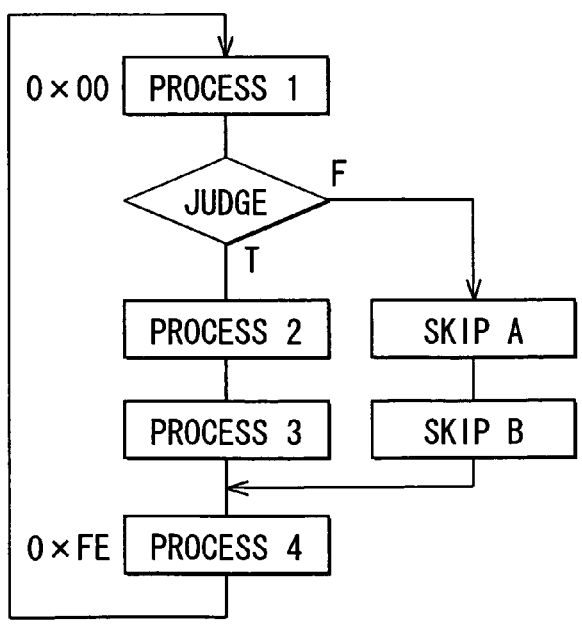
FIG. 3A is a flow chart showing a L task process in the microcomputer according to the first embodiment.

Next, a description is made of operations as to the microcomputer 31 of the embodiment with reference also to FIG. 3A to FIG. 4B. FIG. 3A indicates an example of process flow operations in the case that the microcomputer 31 according to the embodiment executes the L task. In this embodiment, also in the L task, a process operation equivalent to the conditional branch instruction can be realized.

Figure 3B:
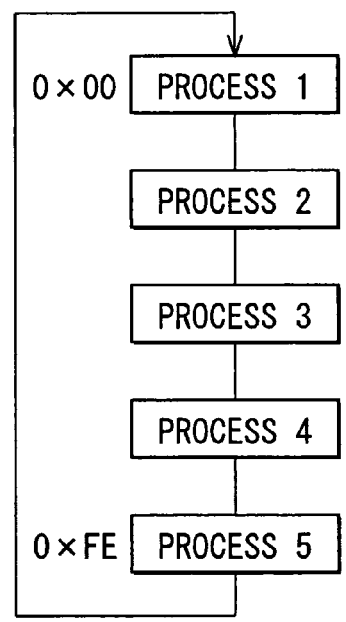
FIG. 3B is a flow chart showing a L task process in a microcomputer according to a comparison of the first embodiment.

For example, FIG. 3B represents the conventional process flow operations for the L task. In the conventional process flow operations, while the execution of the branch instruction is prohibited, when various process steps from a process step (1) to a process step (5) are sequentially carried out and then the program counter 23 is brought into an overflow state, the count value of this program counter 23 is returned to the initial value (namely, address "0"), and also, the process operation is fix-looped in such a manner that the process operations defined from the process step (1) up to the process step (5) are repeatedly carried out. It should be also noted that since these process operations merely indicate a large number of instructions executed by the CPU 32 in an exemplification manner, a total number of these process steps is not made coincident with the increased addresses of the instruction addresses.

To the contrary, in the L task of the embodiment, instead of the above-described process step (5), a "judging" step is inserted between the process step (1) and the process step (2). In the case that a result of this condition judging process becomes a truth (T), the CPU 32 executes the process steps (2) and (3). In the case that a result of this condition judging process becomes a false (F), the CPU 32 skips the execution of the process steps (2) and (3) (namely, in skip steps A and B), and executes the process step (4).

It should also be noted that in the L task, such conditions that the increased value of the program counter 23 is constant and the isochronism of the process times are guaranteed must be satisfied. In other words, these conditions must not be varied in response to the result of the "judging" step. In this embodiment, the skip process steps A and B which substitute for the process steps (2) and (3) are executed as in FIGS. 4A and 4B.

Figure 4A:
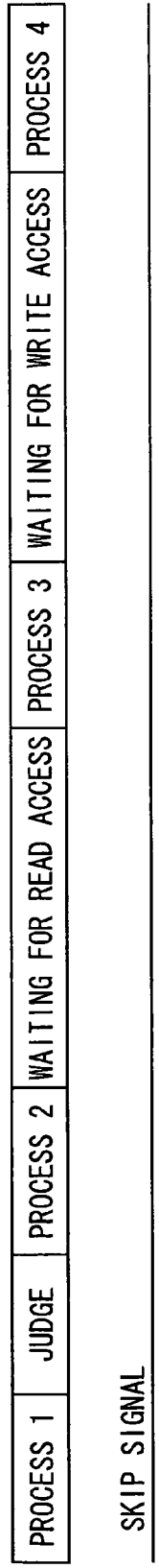
FIG. 4A is a timing chart showing a case of normal execution, i.e., a case of "TRUE" decision step.
Figure 4B:
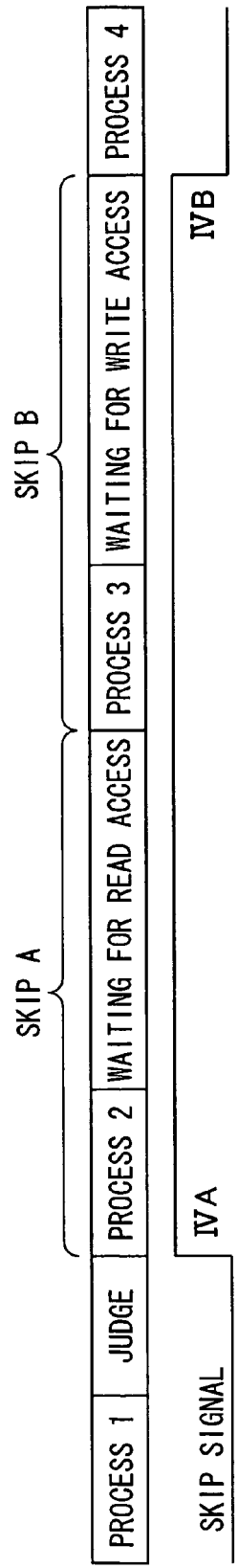
FIG. 4B is a timing chart showing a case of skip execution, i.e., a case of "FALSE" decision step, according to the first embodiment.
Figure 5:
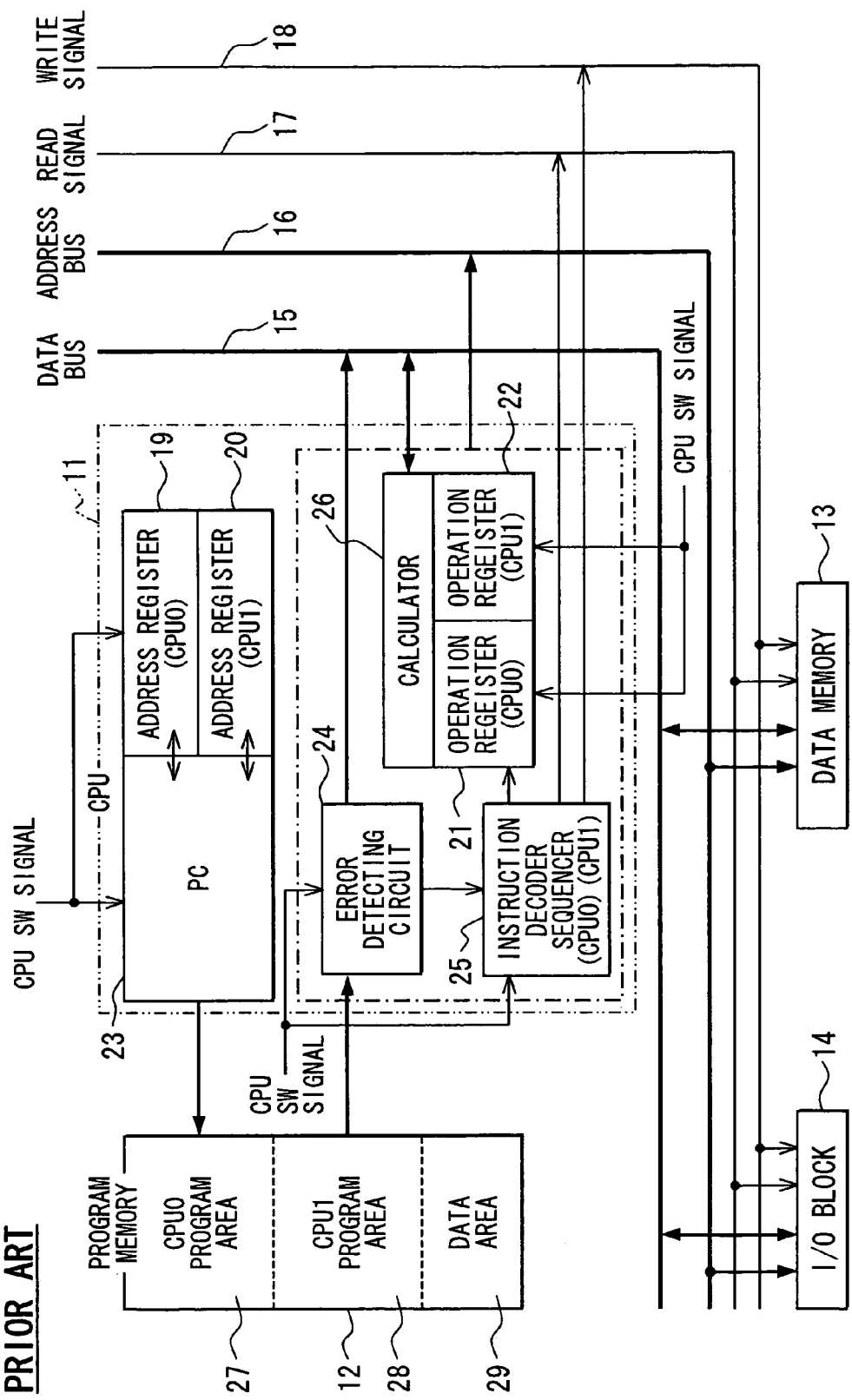
FIG. 5 is a schematic block diagram showing a microcomputer according to a prior art.
Figure 6:
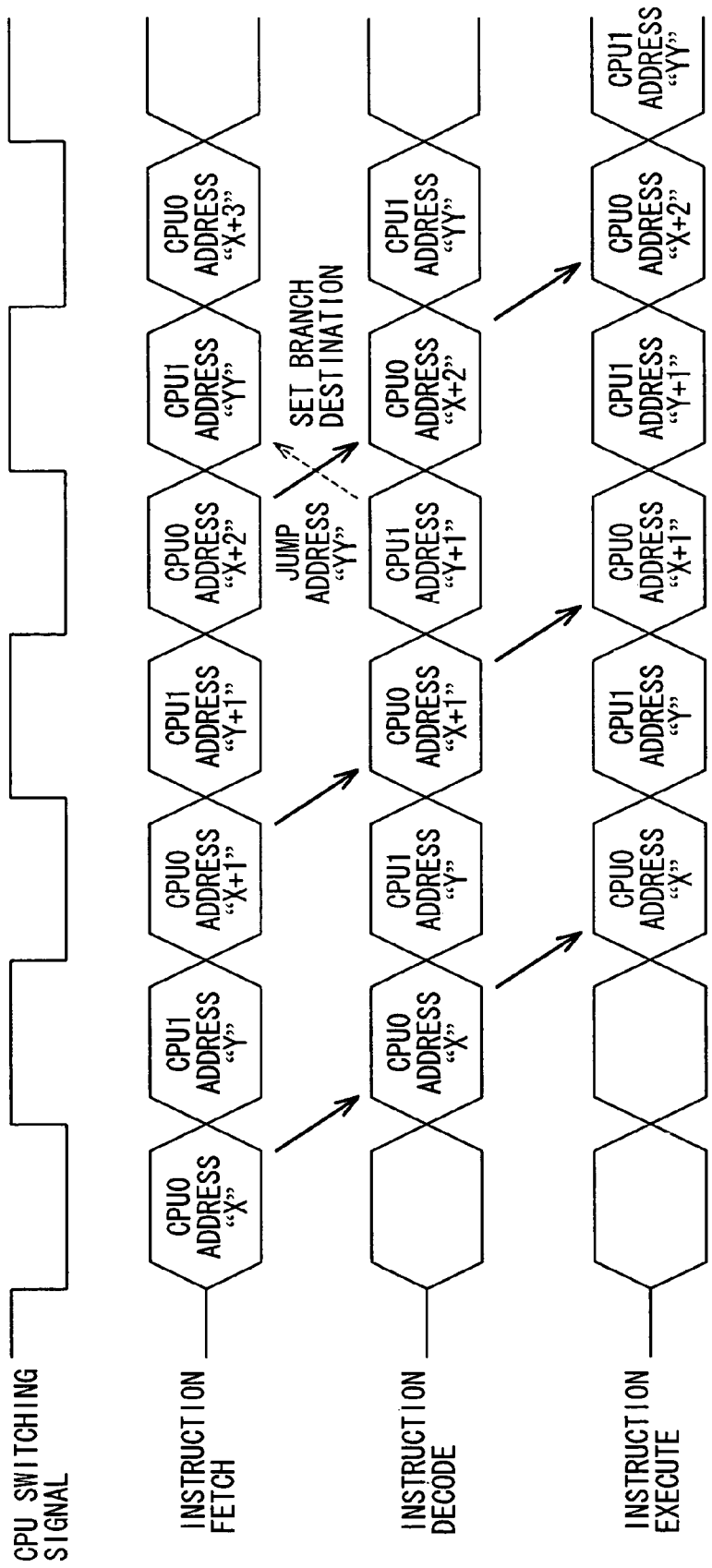
FIG. 6 is a timing chart showing a pipeline process in a case where an instruction of "Address YY" is a branching instruction to "Address YY," according to the prior art.

FIGS. 4A and 4B are timing charts for indicating such a case that the process steps are carried out in response to the flow chart of FIG. 3A. FIG. 4A shows the timing chart corresponding to such a case that a result of a judging step becomes a "truth", whereas FIG. 4B shows the timing chart corresponding to such a case that a result of a judging step becomes a "false." Specifically, FIG. 4A represents normal execution, and FIG. 4B represents skip execution. Here, in FIG. 4B, IVA represents prohibition to write into a register, and IVB represents access to a dummy address. It is so assumed that the process step (2) corresponds to a load instruction with respect to either the peripheral circuit 38 or the peripheral circuit 39, whereas the process step (3) corresponds to a store instruction with respect to either the peripheral circuit 38 or the peripheral circuit 39. Then, a wait cycle is inserted for, for example, two cycles by the BSC 40 into a read access and a write access which are executed in response to these load instruction and store instruction, and further, three cycles are required so as to execute the process steps (2) and (3).

As indicated in FIG. 4B, in the case of the skip A, the CPU 32 fetches, decodes, and executes the load instruction of the process operation (2) in a similar to the case of FIG. 4A. It should also be understood that at a stage for decoding the load instruction, the write prohibit signal (high active signal) is outputted from the skip judging circuit 33 to the register 35. As a result, such a data which has been read via the address bus/load store unit 36 by executing the read cycle is not written into the register 35. As a consequence, the executed result of the read cycle is not reflected to the internal unit of the CPU 32, but may become equal to such a condition that the CPU 32 essentially does not execute the load instruction.

Also, in such a case that an instruction in the process operation (2) corresponds to a calculation instruction, this calculation instruction is processed in a similar manner to that for the case of the load instruction, and although the CPU 32 executes the calculation instruction in the calculator 26, an execution result of this calculation instruction is not written into the register 35.

Also, in the case of the skip B, the CPU 32 fetches, decodes, and executes the store instruction of the process operation (3) in a similar to the case of FIG. 4A. It should also be understood that even when the store instruction is decoded, the write prohibit signal is outputted from the skip judging circuit 33 to the address bus/load store unit 36. As a result, such an address, which is outputted to the address bus 15 in the case that the write cycle is executed, is converted into the dummy address area of either the peripheral circuit 38 or 39. As a consequence, the data is not written into either the peripheral circuit 38 or 39, which may become equal to such a condition that the CPU 32 does not essentially execute the store instruction.

As previously explained, in accordance with this embodiment, even in such a case that the CPU 32 executes the conditional judging instruction described in the L task, and as a result, the CPU 32 need not execute the instructions described in the L task after this conditional judging instruction, the CPU 32 outwardly executes the instructions which are not required to be executed. As a result, the count value of the program counter 23, in the case that the CPU 32 executes the L task, is increased similar to that of such a case that the execution of the conditional judging instruction is required, and the time elapses, which is similar to the time required in the case that this conditional judging instruction, is executed. However, since it is prohibited that the executed result of this conditional judging instruction is reflected onto the CPU 32 itself, or either the peripheral circuit 38 or 39, the execution condition of the CPU 32 becomes similar to such a case that the CPU 32 essentially does not execute the instruction.

As a result, a similar effect may be obtained as that for such a case that the CPU 32 executes the branch instruction. Then, the increased value of the instruction addresses becomes constant and the execution times of the instructions become equal to each other irrespective of the judging result of the conditional judging instruction. As a consequence, also in the L task, while the isochronism of the processing times is maintained, the conditional branching processing operation can be carried out, and the program can be described in more various modes.

Also, in such a case that the instruction, which is not required to be executed, corresponds to the load instruction, since it is so prohibited that the CPU 32 executes this load instruction and writes the read data into the internal register 35 thereof, the execution result of the load instruction is not reflected to the CPU 32, and the same condition as that of such a case that the CPU essentially does not execute the load instruction can be maintained. Also, a similar effect to that of the above-described load instruction case may be achieved in the case that the instruction, which is not required to be executed, corresponds to the calculation instruction.

Also, in such a case that the instruction which is not required to be executed corresponds to the store instruction, the CPU 32 converts the operand address of this store instruction into such a dummy address that the writing subject of the data is not actually present, and then, outputs the converted dummy address, and the BSC 40 resends the acknowledge signal with respect to this access operation. As a result, the bus error does not occur, but also, the execution result of the store instruction is not reflected to the peripheral circuits 38 and 39. As a consequence, the same status as that for such a case that the CPU 32 essentially does not execute the store instruction can be maintained.

Also, in the case that the CPU 32 converts the operand address of the store instruction into the dummy address, all of the lower grade-side bits of this operand address are converted into "1" only by a predetermined bit number. As a result, since the upper grade bits of this operand address are directly maintained, the access operation to the address area of either the peripheral circuit 38 or the peripheral circuit 39 can be secured, and the CPU 32 can access the dummy area arranged on the rear end side of this address area.

The present invention is not limited only to the above-described embodiment but also to the embodiment described in the drawings, but may be modified as follows:

That is, in the case that the CPU 32 converts the operand address into the dummy address, a predetermined address value may be alternatively added to the operand address. Also, the dummy address need not beset with respect to each of the access subjects, but one common area may be alternatively set.

The BSC 40 may be alternatively provided, if necessary.

A total number of tasks which are processed by the CPU 32 in the parallel mode may be alternatively selected to be larger than, or equal to "3."

The increased value of the instruction addresses in the specific task may be alternatively selected to be "1", or "4."

The branch instruction signal need not be limited only to such a signal outputted by the instruction decoder 25, but may be alternatively produced/outputted by the calculator 26 and the skip judging circuit 33.

As to the instruction length, two sorts, or more sorts of instruction lengths such as one-word length and two-word length may be alternatively employed.

Second Embodiment

Figure 7:
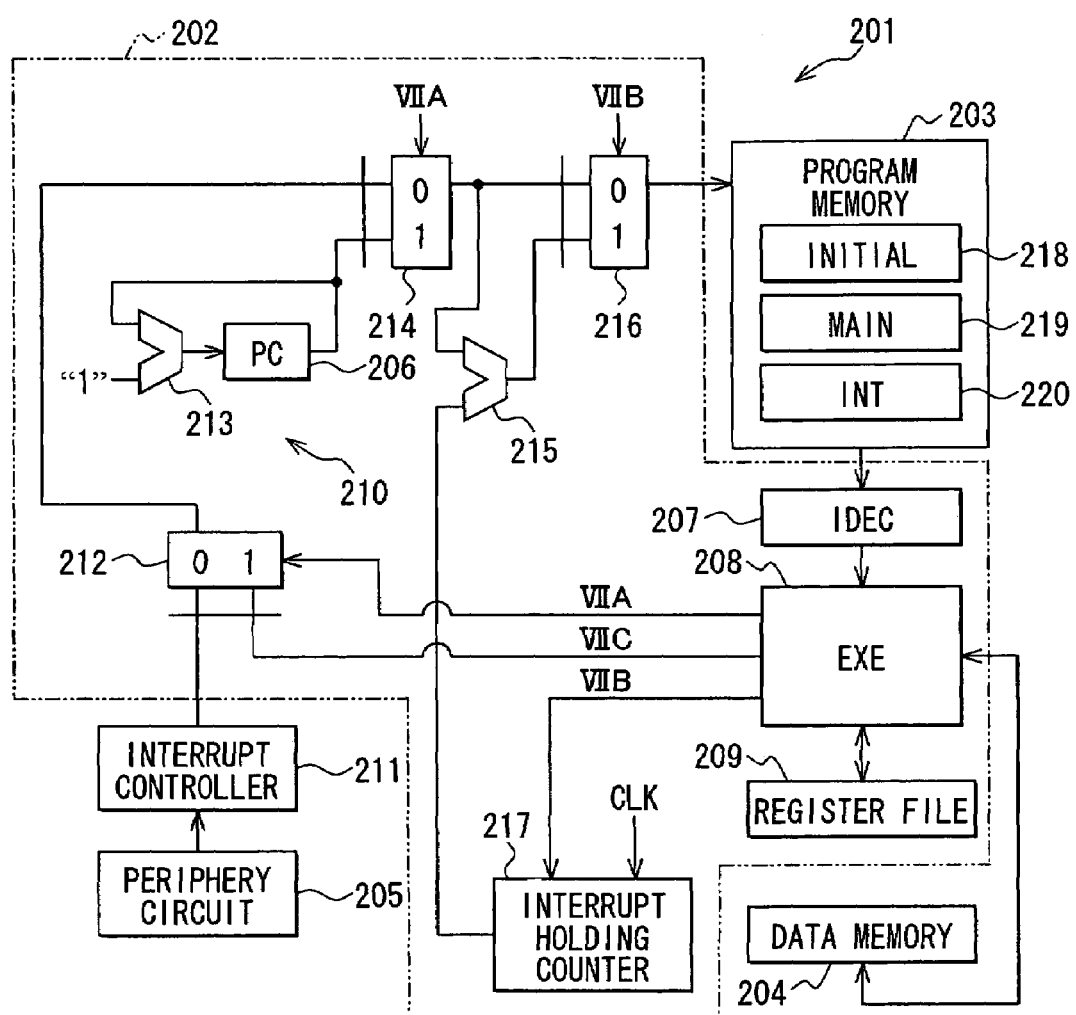
FIG. 7 is a schematic block diagram showing a main part of a microcomputer according to a second embodiment of the present invention.

Referring now to FIG. 7 to FIG. 10, a second embodiment of the present invention will be described. FIG. 7 is a functional block diagram for schematically indicating only an arrangement related to the gist of a microcomputer 201 according to the second embodiment of the present invention. Here, in FIG. 7, VIIA represents a branch condition, VIIB represents an interrupt hold, and VIIC represents a branch address. The microcomputer 201 is arranged by a CPU 202, a program memory 203, a data memory 204, a peripheral circuit 205, an interrupt controller 211, and the like.

The CPU 202 is internally equipped with a program counter (PC) 206, an instruction decoding unit (IDEC) 207, an executing unit (EXE) 208, a register file 209, an interrupt control unit 210, and the like. The instruction decoding unit (IDEC) 207 decodes an instruction fetched from the program memory 203. The executing unit (EXE) 208 executes the instruction decoded by the instruction decoding unit (IDEC) 207. In such a case that a branch condition can be established in an execution of an instruction, the executing unit 208 sets a branch condition establishing signal to be active, and also outputs an address of a branch destination (branch address), while other functional units employed in the CPU 202 can refer to this branch condition establishing signal. Also, in the case of such a specific instruction that a length of an instruction under execution becomes longer than, or equal to two cycles, the executing unit 208 sets an interrupt holding signal to be active (high level), while other functional units in the CPU 202 similarly can refer to this interrupt holding signal.

The interrupt control unit 210 is arranged by a multiplexer 212, an adder 213, another multiplexer 214, another adder 215, a further multiplexer 216, and an interrupt holding counter 217. Upon receipt of an interrupt request issued by the external peripheral circuit 205 of the CPU 202, the interrupt controller 211 outputs an interrupt signal to the CPU 202. Then, when an interrupt permission signal is given from the CPU 202, the interrupt controller 211 produces an interrupt vector in response to a factor of an interrupt request, and then, outputs the generated interrupt vector to the CPU 202. In other words, in this second embodiment, the peripheral circuit 205 indicates, for example, a generation source of an interrupt request issued from a timer and the like. The multiplexer 212 normally selects this interrupt vector to output the selected interrupt vector, and when the branch condition establishing signal becomes active, the multiplexer 212 selects a branch address given from the executing unit 8 to output the selected branch address.

The adder 213 is used so as to increment the count value of the program counter 206 in the unit of "1." In other words, it is so assumed that as to a size of a general-purpose instruction which is executed by the CPU 202, one word is equal to one byte. The multiplexer 214 normally selects an output address of the program counter 206 to output the selected output address, and when a branch condition can be established (in this case, issuing of interrupt request is included), this multiplexer 214 selects a branch address (including interrupt vector) which is outputted via the above-described multiplexer 212 to output the selected branch address.

The adder 215 adds a count value counted by the interrupt holding counter 217 to an address outputted via the multiplexer 214, and then, outputs the added address/count value to the multiplexer 216. The multiplexer 216 normally selects the side of the multiplexer 214, and when the interrupt holding signal becomes active, the multiplexer 216 selects the side of the adder 215, and then, outputs the added address/count value as an instruction fetch address with respect to the program memory 203. Also, the interrupt holding counter 217 counts a time period during which the interrupt holding signal outputted by the executing unit 208 becomes active by such a clock signal which determines an instruction executing basic cycle of the CPU 202. It should also be noted that a phase of this clock signal has been delayed within 90 degrees.

As a control program, an initial process program (INITIAL) 218, a main program (MAIN) 219, an interrupt process program (INT) 220, and the like are stored in the program memory 203. In this case, the interrupt process program 220 is described as indicated in, for example, FIG. 8B. In other words, assuming now that a head address of the interrupt process program 220 corresponds to "200", an address at which an interrupt process operation is essentially commenced (commencement of stack process operation) becomes "204." Then, nop (No Operation) instructions are arranged at addresses "200" to "203." Here, in FIG. 8B, VIIIA represents a normal interrupt branching position, VIIIB represents a branching position when the interrupt hold corresponds to one cycle, VIIIC represents a branching position when the interrupt hold corresponds to two cycles, and VIIID represents a branching position when the interrupt hold corresponds to three cycles.

Figures 8A, 8B:
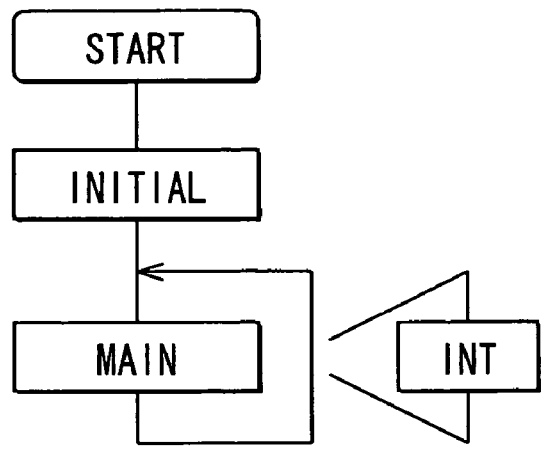
FIG. 8A is a flow chart showing a control program of a CPU.
FIG. 8B is a program sample showing an interrupt process, according to the second embodiment.

Next, a description is made of operations as to the microcomputer 201 of the second embodiment with reference also to FIG. 8A to FIG. 10. FIG. 8A is a flow chart for schematically showing flow operations realized when the CPU 202 executes the control program. When a reset is released and the CPU 202 is started, the CPU 202 firstly executes the initial process program 218, and thereafter, executes the main program 219. Then, if an interrupt request is issued while the main program 219 is executed by the CPU 202, then the process operation of the main program 19 is branched to the interrupt process program 220 and the CPU 202 executes this interrupt process program 220. When the execution of this interrupt process program 220 is accomplished, the process operation is returned to the main program 219.

Figure 14A:
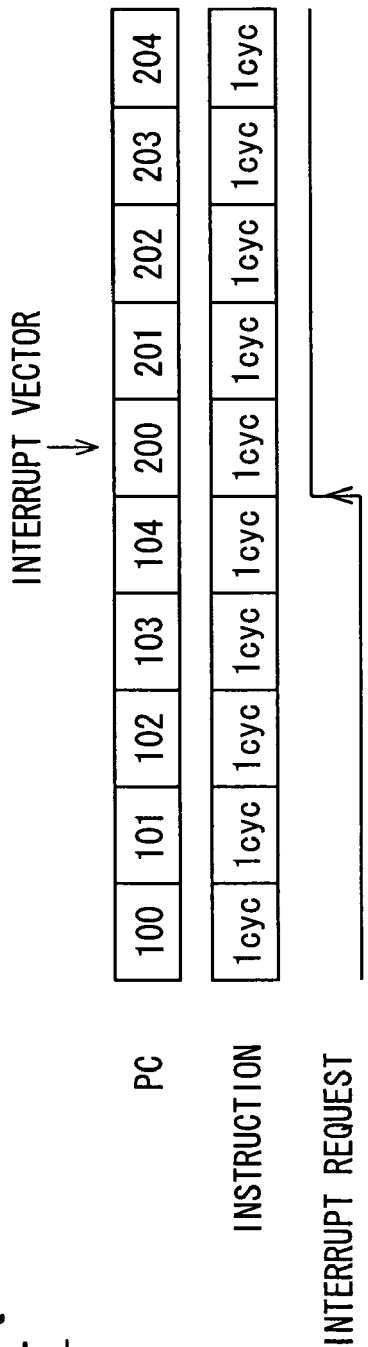
FIG. 14A is a timing chart showing a case where an interrupt request is occurred during execution of a normal instruction.

FIG. 9A represents a timing chart which corresponds to that shown in FIG. 14A. Here, in FIG. 9A, IXA represents "PC=INTERRUPT VECTOR (200)+NO HELD PORTION (0)=200," IXB represents "CYCLES UP TO INTERRUPT PROCESS ADDRESS 204 CORRESPOND TO FOUR CYCLES," IXC represents "PC=INTERRUPT VECTOR (200)+HELD PORTION (1)=201," and IXD represents "CYCLES UP TO INTERRUPT PROCESS ADDRESS 204 CORRESPOND TO FOUR CYCLES." A major portion of the main program 219 is described by general-purpose instructions, while an execution time of one general-purpose instruction corresponds to one cycle. Then, while the CPU 202 executes a general-purpose instruction (i.e., a normal instruction), if an interrupt request is issued and the CPU 202 permits an interrupt process operation, then the interrupt controller 211 outputs an interrupt vector "200." This interrupt vector "200" is applied via the multiplexer 212 to the multiplexer 214. The multiplexer 214 selects the side of the multiplexer 212, whereas the multiplexer 216 selects the side of the multiplexer 214. As a result, the multiplexer 16 outputs "200" as a fetch address.

In this case, the process operation is immediately branched from the main program 219 to the interrupt process program 220 so as to execute the interrupt process operation without holding the interrupt request. As a result, a time period from the issue of the interrupt request until the interrupt process operation is essentially commenced (address "204") becomes four cycles. During the four-cycle time period, the nop instructions are executed by the CPU 202. It should be understood that an interrupt signal outputted with respect to the CPU 202 is synchronized with a clock, and thus, an interrupt request may be recognized by the CPU 202 at such a time instant when a cycle is commenced.

Figure 14B:
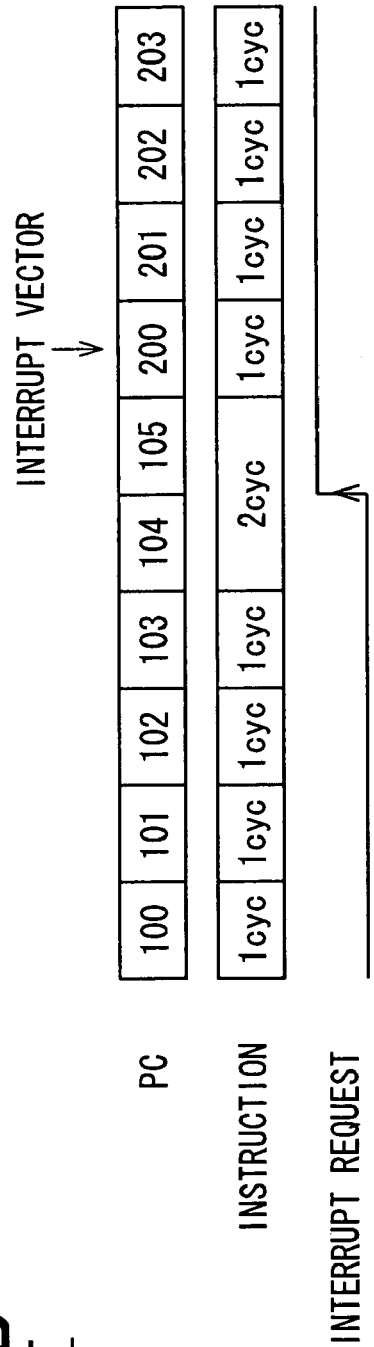
FIG. 14B is a timing chart showing a case where an interrupt request is occurred during execution of two cycle special instruction, according to a prior art.

On the other hand, FIG. 9B is a timing chart which corresponds to that shown in FIG. 14B. A specific instruction (i.e., a two cycle special instruction) whose execution time becomes longer than, or equal to two cycles is also described in a portion of the main program 219. For example, assuming now that an instruction whose execution time is equal to one cycle corresponds to a one-word instruction, such a specific instruction whose execution time is equal to two cycles corresponds to a two-word instruction. Then, in this second embodiment, in such a case that the specific instruction whose execution time is equal to two cycles is executed in the executing unit 208, the executing circuit 208 causes the interrupt holding signal to become active only for a time period corresponding to one cycle. As a result, the interrupt holding counter 217 counts "1" corresponding to this active time period, and then, outputs this count value to the adder 215.

When an interrupt request is issued while this specific instruction is executed, the interrupt controller 211 outputs an interrupt vector "200" similar to the above-explained case of FIG. 9A, and the multiplexer 216 is selected the side of the adder 215, so that the multiplexer 216 outputs "200+1=201" as a fetch address. Then, since the specific instruction is executed over two cycles, the interrupt process operation is held for one cycle, and the process operation is branched from the main program 219 to the interrupt process program 220. As a result, also in this case, a time period from the occurrence of the interrupt request until the interrupt process operation is essentially commenced becomes four cycles, which becomes similar to the above-described case of FIG. 9A.

Figure 10:
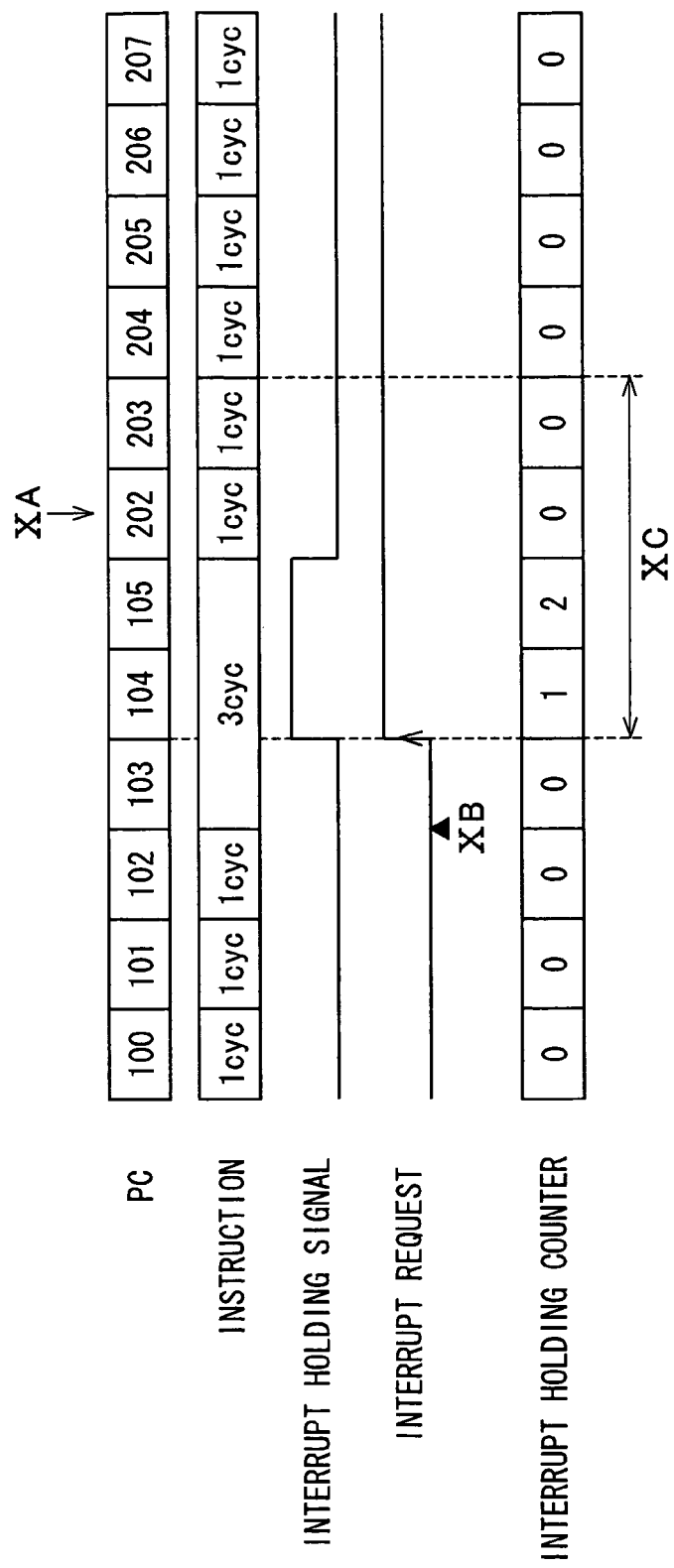
FIG. 10 is a timing chart showing a case where an interrupt request is occurred during execution of a three cycle special instruction, according to the second embodiment.

FIG. 10 is a timing chart for representing such a case that an interrupt process request is issued while a specific instruction whose execution time is equal to three cycles. Here, in FIG. 10, XA represents "PC=INTERRUPT VECTOR (200)+HONDLING COUNTER (2)=202," XB represents "ASSUMING NOW THAT AN INTERRUPT REQUEST IS ISSUED AT THIS TIMING, THE INTERRUPT REQUEST IS ACCEPTED," XC represents "CYCLES UP TO INTERRUPT ADDRESS 204 CORRESPOND TO FOUR CYCLES." In this case, the executing unit 208 causes the interrupt holding signal to become active only for a time period corresponding to two cycles. As a result, the interrupt holding counter 217 counts "2" corresponding to this active time period, and then, outputs this count value to the adder 215. Then, when an interrupt request is issued while this specific instruction is executed in the executing unit 208, the interrupt controller 211 has outputted an interrupt vector "200", so that the multiplexer 216 outputs "200+2=202" as a fetch address. Then, since the specific instruction is executed over three cycles, the interrupt process operation is held for two cycles, and thereafter, the process operation is branched from the main program 219 to the interrupt process program 220. As a result, also in this case, a time period from the occurrence of the interrupt request until the interrupt process operation is essentially commenced becomes four cycles, which becomes similar to the above-described case of FIG. 9A.

As previously explained, in this second embodiment, while the interrupt process program 220 which is executed by the CPU 202 is described in such a manner that the plurality of nop instructions are arranged from the head of this interrupt process program 220 just before such an instruction that the interrupt process operation is essentially commenced, in such a case that the executing unit 208 of the CPU 202 executes the specific instruction, the executing unit 208 outputs the interrupt holding signal to the external unit in response to such a time during which the execution time of this specific instruction exceeds the execution time of the general-purpose instruction. If the interrupt holding signal is outputted from the executing unit 208 at the time instant when the interrupt request is issued, then the interrupt control unit 210 increases the fetch address value of the instruction with respect to the interrupt process program 220 in response to the output time period of this interrupt holding signal. As a consequence, the time constant characteristic of the interrupt process operation may be secured, the interrupt process operation can be executed without any shift of even one cycle, and the communication function can be realized by employing both the timer interrupt operation and the software process operation without using the communication control block, so that the dimension of the microcomputer 201 can be made constant.

Also, the output time period of the interrupt holding signal is counted by the holding counter 217, and the interrupt control unit 210 sets the increased value of the fetch address in response to this counted value. As a result, even in such a case that the time during which the interrupt process operation is held is not constant, the time constant characteristic of the interrupt process operation can be readily secured.

Third Embodiment

Figure 11:
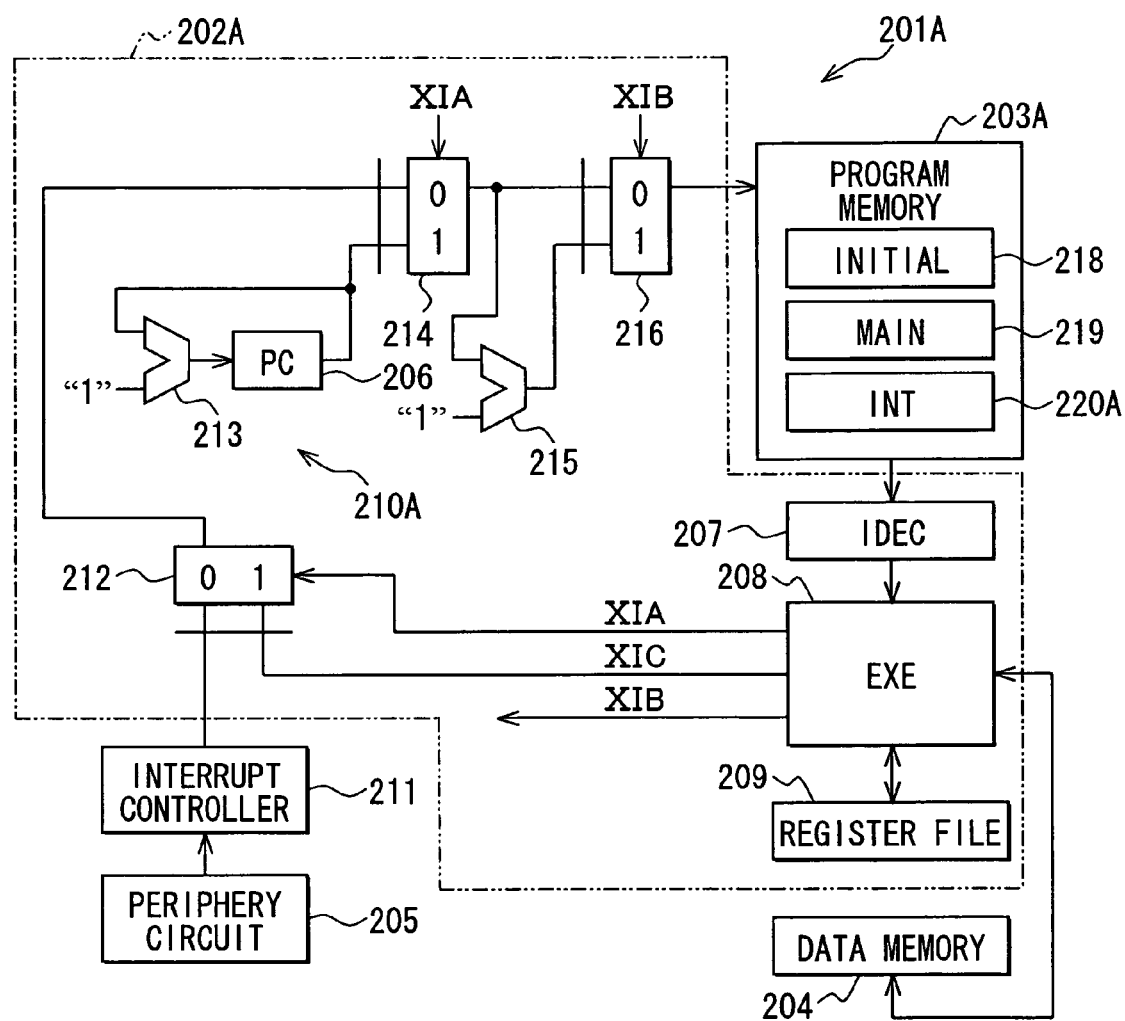
FIG. 11 is a schematic block diagram showing a main part of a microcomputer according to a third embodiment of the present invention.

FIG. 11 to FIG. 13B indicate a microcomputer 201A according to a third embodiment of the present invention. It should also be understood that the same reference numerals shown in the second embodiment will be employed as those for denoting the same, or similar structural elements indicated in the third embodiment, and explanations thereof are omitted, and thus, only different structural elements of the third embodiment will be explained. FIG. 11 is a functional block diagram for schematically indicating only an arrangement related to the gist of the microcomputer 201A according to the third embodiment of the present invention. Here, in FIG. 11, XIA represents a branch condition, XIB represents an interrupt hold, and XIC represents a branch address. Further, the microcomputer 201A includes a program memory 203A, an interrupt control unit 210A, and an interrupt process program 220A in the program memory 203A. That is, the microcomputer 201A of the third embodiment is arranged in correspondence with such a case that a specific instruction to be used is restricted only to such an instruction whose execution time corresponds to two cycles, and arranged in such a manner that the interrupt holding counter 217 is removed from the above-described arrangement of the microcomputer 201 of the second embodiment. Then, an address increment "1" of an interrupt vector is applied to one input terminal of an address 215 in a fixed manner.

Also, as represented in FIG. 12, an interrupt process program 220A is described in such a manner that a nop instruction is arranged only at a head address "200", and an essential interrupt process operation is commenced from an address "201" next to the head address.

Next, a description is made of operations as to the microcomputer 201A of the third embodiment with reference also to FIGS. 13A and 13B. Here, in FIGS. 13A and 13B, XIIIA represents "PC=INTERRUPT VECTOR (200)+NO HELD PORTION (0)=200," XIIIB represents "CYCLES UP TO INTERRUPT PROCESS ADDRESS 201 CORRESPOND ONE CYCLE," XIIIC represents "PC=INTERRUPT VECTOR (200)+NO HELD PORTION (1)=201," and XIIID represents "CYCLES UP TO INTERRUPT PROCESS ADDRESS 201 CORRESPOND ONE CYCLE." In this third embodiment, as indicated in FIG. 13A, when an interrupt request is issued while a general-purpose instruction is executed and a process operation of this interrupt request is permitted by a CPU 202A, similar to the second embodiment, the interrupt controller 211 outputs an interrupt vector "200" and the multiplexer 16 outputs "200" as a fetch address. In this case, while the interrupt request is not held, the process operation of the main problem 219 is immediately branched from the main program 219 to the interrupt process program 220A, so that an interrupt process operation is carried out by the CPU 202A. As a result, a time period from the occurrence of the interrupt request until the interrupt process operation is essentially commenced (namely, address "201") becomes one cycle.

On the other hand, as shown in FIG. 13B, in such a case that a specific instruction whose execution time is equal two cycles is executed in the executing unit 208, this executing unit 208 causes an interrupt holding signal to become active only for such a time period corresponding to one cycle. As a result, the multiplexer 216 selects the side of the adder 215, so that this multiplexer 216 outputs "200+1=201" as a fetch address. Then, the interrupt process operation is held for one cycle, and the process operation is branched from the main program 219 to the interrupt process program 220A. As a consequence, also in this case, a time period from the occurrence of the interrupt request until the interrupt process operation is essentially commenced becomes one cycle, which becomes similar to the above-described case of FIG. 13A.

As previously explained, in accordance with the third embodiment, in such a case that an execution time difference between a general-purpose instruction and a specific instruction is fixed (in this case, one cycle), since the interrupt holding counter 217 used in the second embodiment is no longer required, the arrangement of the microcomputer 201A can be made simpler.

The present invention is not limited only to either the above-described embodiments or the embodiments shown in the drawings, but may be modified as follows.

That is, an execution time period of a general-purpose instruction which is executed by a CPU is not limited only one cycle, but may be alternatively selected to be longer than, or equal to two cycles, and if an execution time period of a specific instruction is longer than the modified execution time of this general-purpose instruction, then this longer execution time thereof may be employed.

A size of an instruction which is executed by a CPU is not limited only to one byte, but may be selected to be two bytes, four bytes, or any larger bytes than four bytes. For instance, in the case that a size of an instruction corresponds to four bytes, an increased value of an address applied to the adder 213 is selected to be "4." Also, as to an increased count value of the interrupt holding counter 217, if an execution time of a general-purpose instruction constructed of four bytes is selected to be four cycles, then this increased count value may be set to "4."

Fourth Embodiment

Next, a fourth embodiment into which the present invention is embodied will now be described with reference to drawings.

Figure 15:
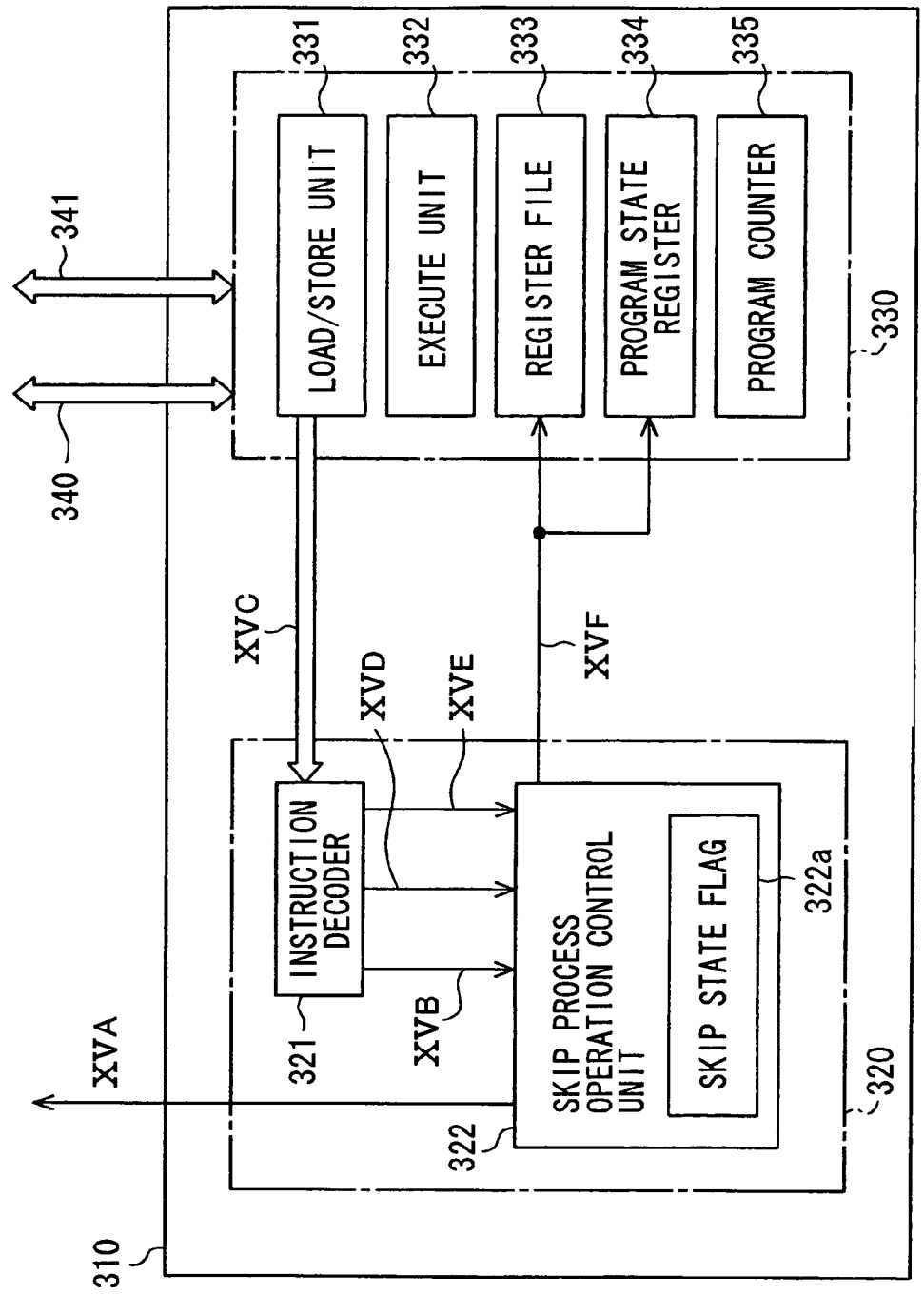
FIG. 15 is a block diagram showing a CPU of a microcomputer according to a fourth embodiment of the present invention.
Figure 16:
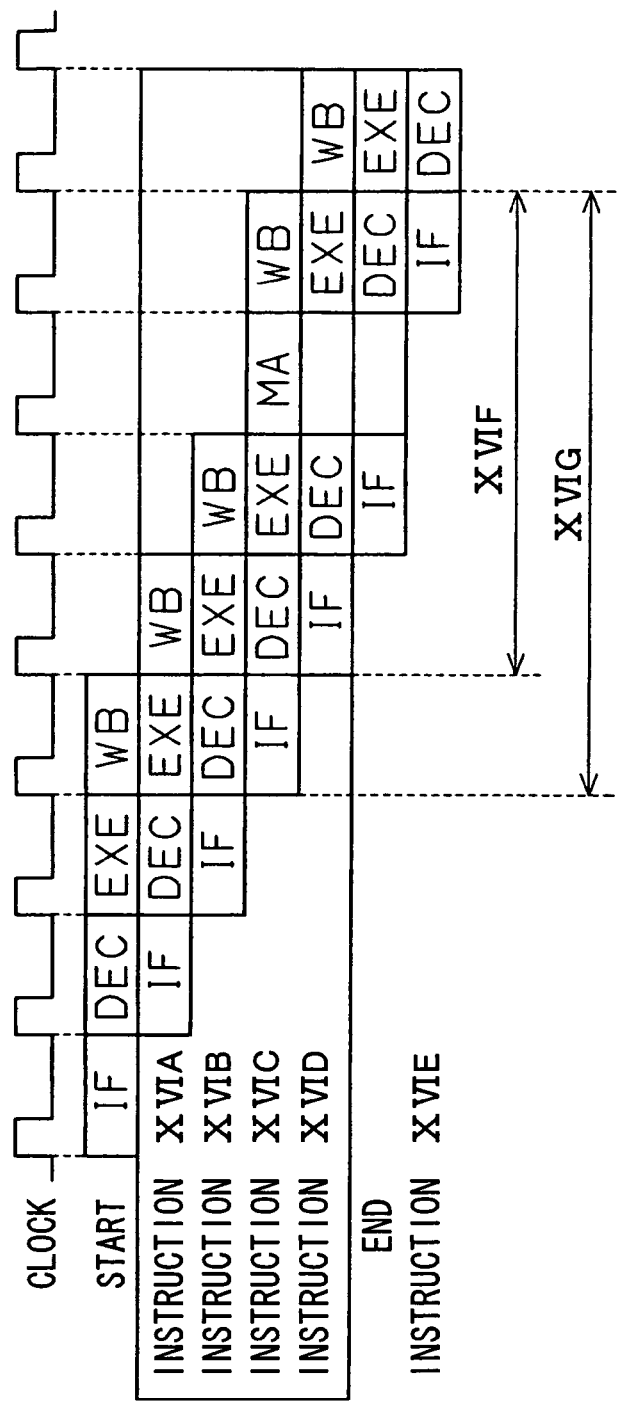
FIG. 16 is a timing chart showing a case of pipeline execution in the CPU, according to the fourth embodiment.

FIG. 15 is a block diagram for indicating an internal arrangement of a CPU (processor) 310 employed in a microcomputer of this fourth embodiment. Here, in FIG. 15, XVA represents "EXTERNAL WRITING CONTROL SIGNAL," XVB represents "WRITE CONTROL SIGNAL," XVC represents "FETCH DATA," XVD represents "SKIP PROCESS OPERATION START SIGNAL," XVE represents "SKIP PROCESS OPERATION END SIGNAL," and XVF represents "INTERNAL WRITE CONTROL SIGNAL." FIG. 16 represents an example as to instruction execution operations by the CPU, more specifically, a pipeline operation by the CPU.

In FIG. 15, the CPU 310 has been arranged by a control unit 320 and a data path 330. The data path 330 is used to store data, and to execute an arithmetic/logic calculation. The control unit 320 controls the data path 330 in response to an instruction fetched from a memory.

The control unit 320 is arranged by both an instruction decoder 321 and a skipping process operation control unit 322. The instruction decoder 321 stores thereinto an instruction fetched from the memory, and decodes the fetched instruction. The skipping process operation control unit 322 functioning as a skipping process operation control means is used to execute a skipping process operation. That is, when a condition judging operation is carried out in a condition branch, in the case that the condition can be established, either one instruction or a plurality of the instruction and the subsequent instructions are invalidated by the skipping process operation control unit 322. The skipping process operation control unit 322 judges as to whether or not the present state corresponds to a skip state based upon both a skipping process operation start signal and a skipping process operation end signal, which are outputted from the instruction decoder 321, and thus, controls a writing operation of data with respect to an internal unit and an external unit of the CPU 310.

The data path 330 has been constituted by a load/store unit 331, an executing unit 332, a register file 333, a program state register 334, and a program counter 335. The load/store unit 331 controls to read data from an external unit of the CPU 310, and also to write data into the external unit. The executing unit 332 executes a predetermined arithmetic/logic calculation in accordance with an instruction decoded by the instruction decoder 321 in response to a control signal outputted from the control unit 320. The register file 333 stores thereinto either data obtained by being executed by the executing unit 332 or data which is acquired from an external unit of the CPU 310 such as the memory. The program state register 334 holds therein a processed state of the CPU 310. The program counter 335 indicates an address of an instruction which is fetched.

In this fourth embodiment, while a bus which connects the CPU 310 to an external peripheral circuit of the CPU 310 is constituted by two sorts of buses (namely, both data bus 340 and address bus 341), the bus architecture of the CPU 310 shown in FIG. 15 is made of a Neumann bus structure.

As represented in FIG. 16, the CPU 310 executes a program by way of a pipeline process operation constituted by five sorts of stages.

The above-explained five sorts of stages are defined by an IF (instruction fetch) stage, a DEC (decode) stage, an EXE (execute) stage, an MA (memory access) stage, and also, a WB (write back) stage. The IF (instruction fetch) stage corresponds to a stage for fetching an instruction from the memory. The DEC (decode) stage corresponds to such a stage for decoding the instruction fetched from the IF stage. The EXE (execute) stage corresponds to such a stage which executes an arithmetic/logic calculation, and calculates an address of an instruction which should be fetched in the IF stage, and another address when an access operation is performed to the memory in response to the content of the instruction decoded in the DEC stage. The MA (memory access) stage corresponds to such a stage that an access operation to the memory is executed in response to the content of the instruction decoded by the DEC stage, while the calculation result obtained in the EXE (execute) stage is used as an address. The WB (write back) stage corresponds to such a stage for writing either the calculated data or the data fetched from the memory into an internal register in response to the content of the instruction decoded by the DEC stage.

In a pipeline process operation made of the Neumann bus structure, in such a case that five stages of pipelines are constructed based upon the above-explained five sorts of stages, the IF stage for fetching the instruction from the memory contends with the MA stage for writing, or reading the data with respect to the memory.

As a consequence, there are various sorts of solutions capable of avoiding the contention between the IF stage and the MA stage. The pipeline operation shown in FIG. 16 as one example of the contention avoiding solutions will now be explained. Here, in FIG. 16, "START" represents "SKIP PROCESS OPERATION START INSTRUCTION," "INSTRUCTION XVIA" represents "ONE-CYCLE INSTRUCTION," "INSTRUCTION XVIB" represents "ONE-CYCLE INSTRUCTION," "INSTRUCTION XVIC" represents "TWO-CYCLE INSTRUCTION, i.e., STORE INSTRUCTION," "INSTRUCTION XVID" represents "ONE-CYCLE INSTRUCTION," "END" represents "SKIP PROCESS OPERATION END INSTRUCTION," "INSTRUCTION XVIE" represents "ONE-CYCLE INSTRUCTION," XVIF represents "FOUR STAGES, i.e., INSTRUCTIONS XVIA, XVIB, and XVID," and XVIG represents "FIVE STAGES, i.e., INSTRUCTIONS XVIA, XVIB, XVIC, and XVID." In FIG. 16, as to instructions XVIA, XVIB, XVID, and a skipping process operation start instruction, which are not required to access the memory, a pipeline is constructed of four stages (namely, IF, DEC, EXE, and WB stages), and after the instruction is executed (EXE stage), a result is written into a register in the next stage (WB stage). On the other hand, as to an instruction XVIC (for example, store instruction) which is required to access the memory, while an MA stage is inserted between an EXE stage and a WB stage, a pipeline is constructed based upon the five sorts of stages. It should be understood that while the MA stage of the instruction XVIC is executed, the pipelines of other instructions are stolen. As a result, although only such an instruction which is required to access the memory must require two cycles, the contention between the IF stage and the MA stage can be avoided.

A description is made of sequential operations as to skipping process operations executed by the CPU 310 with employment of the above-explained structure.

In FIG. 15, a value (address) of the program counter 35 is outputted from the address bus 341, and an instruction corresponding to this address is outputted to the data bus 340 from a ROM (not shown) connected to the bus 341. In the CPU 310, the data on the data bus 340 is fetched via the load/store unit 331, and then, the fetched data is stored in the instruction decoder 321. The instruction decoder 321 decodes a content of the fetched instruction, and executes a predetermined control operation with respect to the external unit of the CPU 310 in response to the content of the decoded instruction.

For instance, in such a case that the fetched instruction corresponds to such an instruction that data of a register R10 is added to data of a register R11 and the added data is written into the register R11, the control unit 320 inputs data of the register R10 and register R11 to the executing unit 332, instructs an adding operation, inputs an execution result with respect to the register file 333, and instructs the register R11 to allow a writing operation.

Now, in the case that the fetched instruction corresponds to a conditional branch instruction, the CPU 310 executes the below-mentioned process operations. In other words, in such a case that the CPU 310 executes a condition judging operation based upon the executed result of the preceding process operation and the process operation jumps instructions subsequent to the present instruction, the CPU 310 executes the below-mentioned process operations.

In the case that the fetched instruction corresponds to a skipping process operation start instruction, a skipping process operation start signal is outputted with respect to the skipping process operation control unit 322 by the instruction decoder 321. Also, in the case that the fetched instruction corresponds to a skipping process operation end instruction, a skipping process operation end signal is outputted with respect to the skipping process operation control unit 322 by the instruction decoder 321.

While the skipping process operation control unit 322 is equipped with a skip state flag 322a for indicating either a skip state or a normal state, the skip state flag 322a is used to control a data writing operation by an instruction. This skip state flag 322a is set to the skip state by receiving the skipping process operation start signal, and also, is set to the normal state by receiving the skipping process operation end signal.

In such a case that the skip stage flag 322a is set and indicates the skip state, the skipping process operation control unit 322 outputs a write prohibiting signal as both an external writing control signal and an internal writing control signal irrespective of a state of a writing control signal outputted from the instruction decoder 321. The external writing control signal controls a writing operation to a peripheral circuit containing the memory. The internal writing control signal controls a writing operation to an internal register such as the register file 333. As a result, in the case that instructions subsequent to this instruction are invalidated in the skipping process operation, the sequential control operation of the instructions are continuously executed, and only the writing operation of the data is prohibited.

The above-indicated skipping process operation control unit 322 functioning as the skipping process operation control means will now be explained in detail by employing pipeline operations while the skipping process operation is carried out (refer to FIG. 16, FIG. 17, FIG. 18), as compared with the general skipping operation example.

FIG. 16 represents such an example that the instruction "XVIA" through the instruction "XVID" are skipped which are present between the skipping process operation start instruction and the skipping process operation end instruction.

Figure 17:
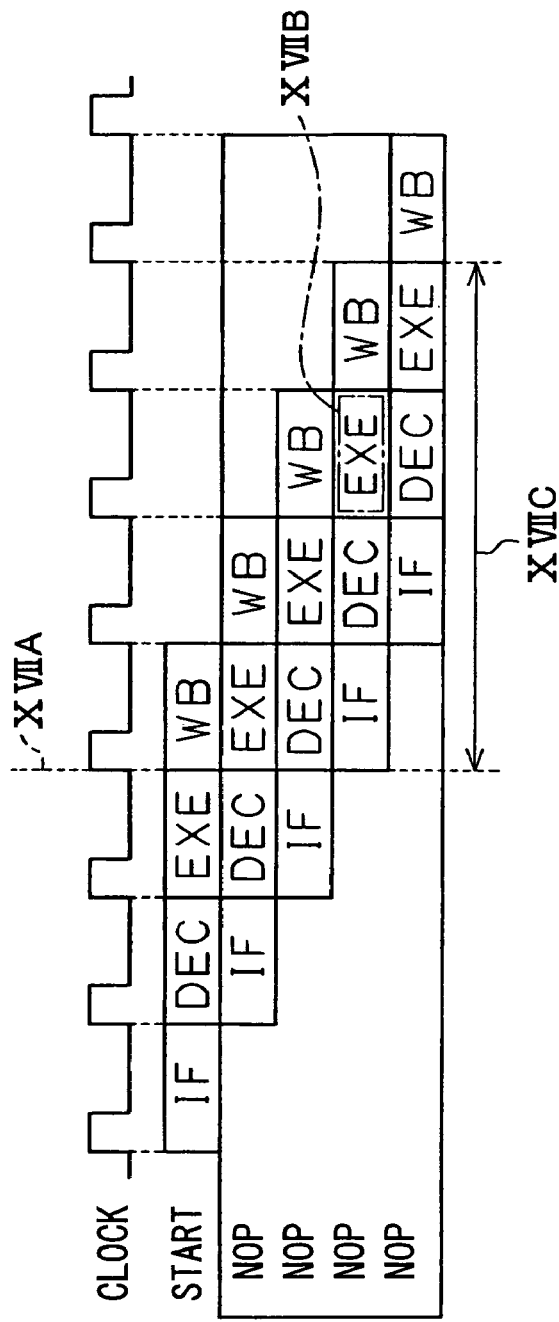
FIG. 17 is a timing chart showing a case of pipeline execution of a general skip process in the CPU.
Figure 18:
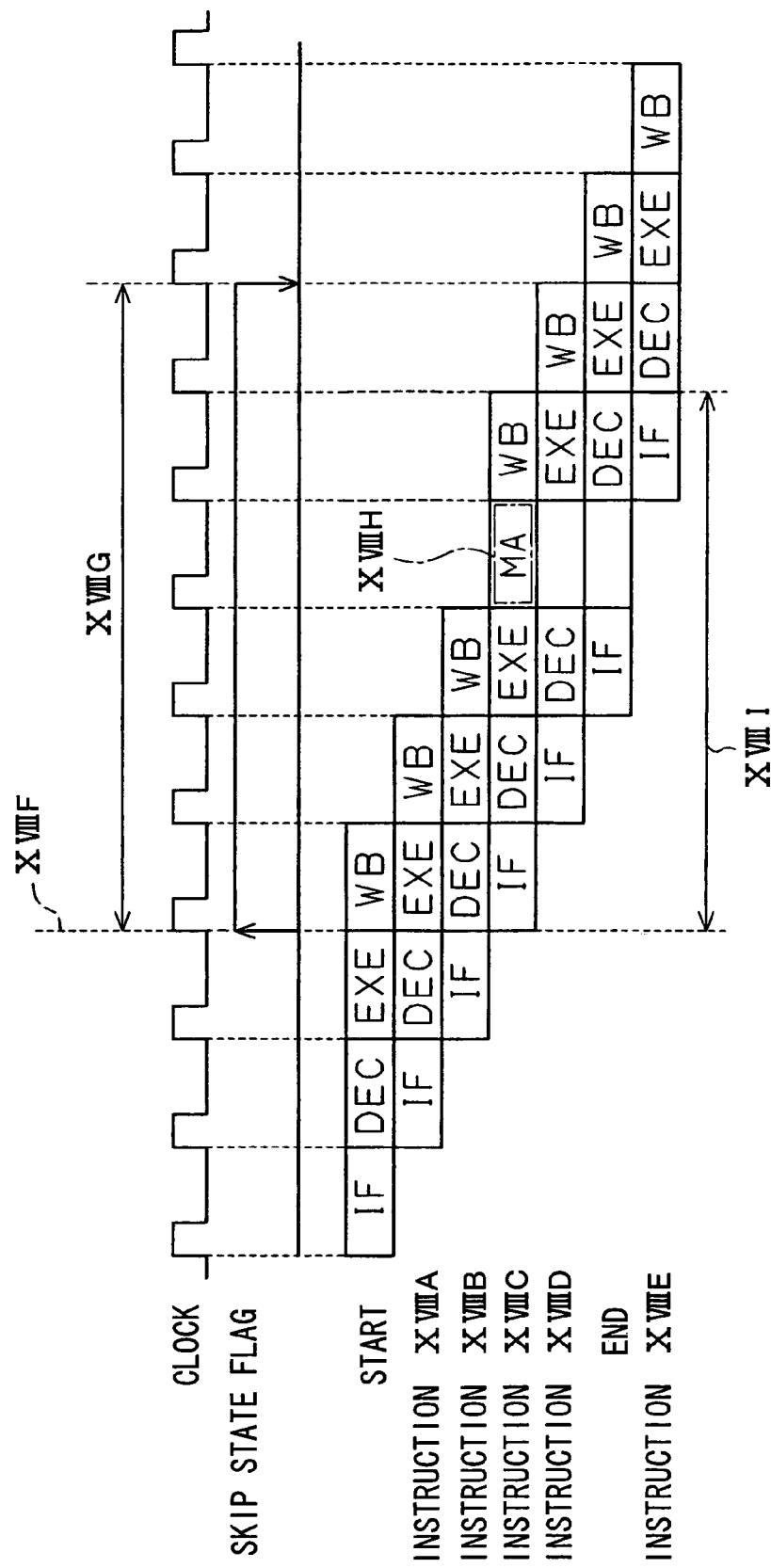
FIG. 18 is a timing chart showing a case of pipeline execution of a skip process in the CPU, according to the fourth embodiment.

FIG. 17 shows a pipeline operation while a general skipping process operation is carried out, whereas FIG. 18 represents a pipeline operation while the skipping process operation according to this fourth embodiment is carried out. Here, in FIG. 17, "START" represents "SKIP PROCESS OPERATION START INSTRUCTION," "NOP" represents "NO OPERATION INSTRUCTION," XVIIA represents "SKIP PROCESS OPERATION START TIMING," XVIIB represents "EX STAGE OF STORE INSTRUCTION WHICH HAS BEEN CONVERTED INTO NO OPERTION INSTRUCTION," and XVIIC represents "TOTAL EXECUTION CYCLE NUMBER OF SKIPPED INSTRUCTIONS." In this case, the "TOTAL EXECUTION CYCLE NUMBER OF SKIPPED INSTRUCTIONS" is "4." Four NOPs are in FIG. 17, and NOP means an instruction which has been converted into no operation instruction by a skipping process operation start instruction. Specifically, NOP means that EX stage of NOP is "INVALID," and WB stage of NOP is "INVALID." In FIG. 18, "START" represents "SKIP PROCESS OPERATION START INSTRUCTION," "INSTRUCTION XVIIIC" is a store instruction, "END" represents "SKIP PROCESS OPERATION END INSTRUCTION," XVIIIF represents "SKIP PROCESS OPERATION START TIMING," XVIIIG represents "SKIP STATE," XVIIIH represents "MA STAGE OF STORE INSTRUCTION," i.e., data writing becomes invalid, and XVIIII represents "TOTAL EXECUTION CYCLE NUMBER OF SKIP INSTRUCTION," which is "5" in this case.

A first description is made of the pipeline operation diagram of the general skipping operation example shown in FIG. 17.

In the general skipping process operation control method, after a skipping process operation start instruction is executed, instructions subsequent to this start instruction are brought into NOP (non-operation) instructions. At this time, in the case that the instruction XVIC shown in FIG. 16 corresponded to the store instruction whose execution time required two cycles, this store instruction is brought into an NOP instruction, so that the MA stage is deleted. As a consequence, the execution time is shortened by one cycle, as compared with the execution time in the case that the skipping process operation is not carried out, so that a total cycle number (execution cycle number) related to the instruction "XVIA" through the instruction "XVID" becomes "4."

On the other hand, in accordance with this fourth embodiment of FIG. 18, even after a skipping process operation start instruction is carried out, an instruction is not brought into an NOP instruction, but only a writing operation of data is prohibited.

When an instruction XVIIIC (store instruction) shown in FIG. 18 is explained as an example, a skip state flag is set to a skip state since the skipping process operation start instruction is executed, and is set to the normal state since the skipping process operation end instruction is executed. The skipping process operation control unit 322 still continues to execute a sequence control operation of the instruction, and prohibits to write the writing control signal even while the skip state flag is under the skip state. In other words, while the skipping process operation is carried out, the skipping process control unit 322 continuously prohibits the data writing operations with respect to the internal and external units of the CPU 310 irrespective of a sort of an instruction. As a result, in an MA stage, the data writing operation is prohibited. Accordingly, although the store instruction (instruction XVIIIC) becomes essentially invalid, a consumption cycle becomes the same two cycles as those when the instruction becomes valid. As a consequence, a total cycle number (total execution cycle number) related to the instruction "XVIIIA" through the instruction "XVIIID" which corresponds to a skipping process section becomes "5" equal to that when the instructions become valid irrespective of sorts of the instructions. In other words, the execution cycles of the instructions can be made constant irrespective of such a fact that the instructions become valid, or invalid. Also, the total cycle number required for executing the process operations in the case that the instruction group made from the instruction "XVIIIA" to the instruction "XVIIID" is skipped can be made equal to that in such a case that this instruction group is not skipped.

As previously explained, in accordance with the pipeline operation during the skipping process operation of the fourth embodiment, even in such a case that as a result of the condition judgement, the condition can be established and the instructions subsequent to this condition establishment are invalidated in the skipping process operation, the sequence control operation of the instructions are continuously carried out, and only the writing operation of the data of prohibited. As a result, a constant instruction cycle number can be consumed irrespective of such a fact that the condition judgement can be established, or not (namely, same instruction cycle can be always consumed irrespective of such a fact as to whether instruction is valid, or invalid by skipping process control operation). In other words, in any of such a case that the skipping process operation is carried out and of such a case that the skipping process operation is not carried out, the execution timing of the instructions after the skipping process operation is accomplished can be made equal to each other. For instance, this pipeline operation may become very effective in such a program that a section from an instruction "1" to an instruction "2" corresponds to a skipping process section (section from instruction "1" to instruction "2" corresponds to condition branching section), and execution timing of the instruction "2" with respect to the instruction "1" is wanted to become always constant (in such a case that execution timing of instruction becomes important, it is possible to avoid shift of execution cycle by condition branch of program).

As previously explained this fourth embodiment owns the following features:

That is, as the program control method, when the condition can be established, in the case that such a skipping process operation is carried out by which either one instruction or the plurality of continuous instructions subsequent to this condition establishment are invalidated, even if the instructions subsequent to this condition establishment are invalidated in the skipping process operation, the sequential control operation of the instructions are continuously carried out, and only the writing operation of the data is prohibited. As a result, the same instruction cycle numbers can be consumed even when the instruction is invalid as well as the instruction is valid, so that the execution cycles can be made constant irrespective of such a fact that the instruction becomes valid, or invalid.

While the CPU (processor) is equipped with the skipping process operation control unit 322 as the CPU (processor), which invalidates either one instruction or the plurality of continuous instructions in such a case that the condition can be established in accordance with the condition judgement, the skipping process operation control unit 322 continuously prohibits the data writing operation with respect to the internal and external units of the processor irrespective of the sort of such an instruction as a one-cycle instruction and a two-cycle instruction. As a result, the same instruction cycle numbers are consumed even when the instruction is invalid as well as the instruction is valid, so that the execution cycles can be made constant irrespective of such a fact that the instruction becomes valid, or invalid. Accordingly, the basic structure capable of prohibiting the data writing operation within the skipping process operation can be constructed in the above-described manner.

In this case, while the skipping process operation control unit 322 is provided with the skip state flag (322*a*) for controlling the data writing operation by the instruction, the skip state flag (322*a*) is set to the skip state by executing the skipping process operation start instruction, whereas the skip state flag (322*a*) is set to the normal state by executing the skipping process operation end instruction, so that the skip state flag (322*a*) can be set and reset.

Fifth Embodiment

Next, a fifth embodiment of the present invention will now be described by mainly considering a different point with respect to the above-explained fourth embodiment.

Figure 19:
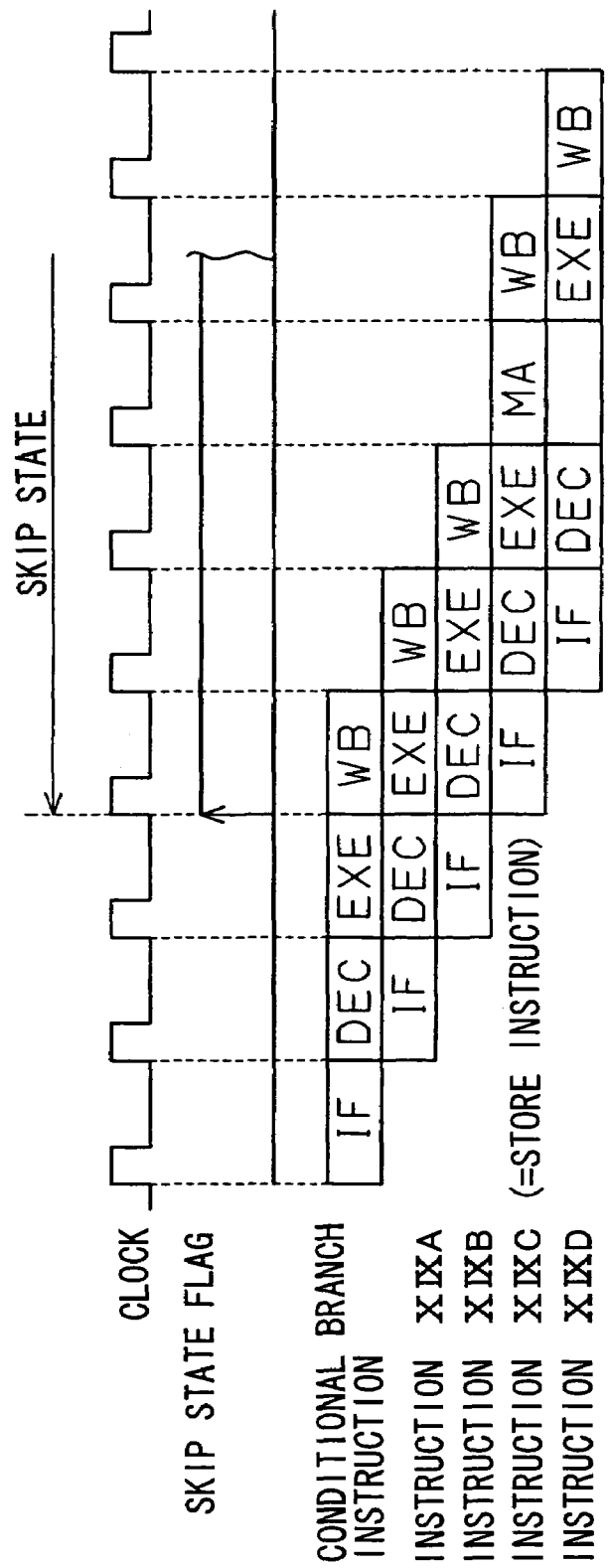
FIG. 19 is a timing chart showing a case of pipeline execution of a skip process in a CPU, according to a fifth embodiment of the present invention.

FIG. 19 shows a pipeline operation diagram as to a skipping process operation of this fifth embodiment, which may be replaced by that of FIG. 18.

Comparing with the fourth embodiment, in this fifth embodiment, a conditional branch instruction is used as the means for setting the skip state flag shown in FIG. 18 to the skip state.

In FIG. 19, an instruction set contains a conditional branch instruction for permitting that a process operation is branched only to a forward routine. Specifically, the conditional branch instruction permits to branch only forwardly. When the conditional branch instruction for permitting that the process operation is branched only to the forward routine can be established, a skipping process operation start signal is outputted with respect to the skipping process operation control unit 322 by the instruction decoder 321. As a result, the skip state flag is set to the skip state, and thus, instructions subsequent to the above-described conditional branch instruction are invalidated. Also, on the other hand, when the condition cannot be established, the skip state flag is kept under the normal state, and thus, instructions subsequent to the above-explained conditional branch instruction are executed. As previously explained, as the program control method, when the conditional branch instruction is carried out, in the case that the condition can be established, the skipping process operation for invalidating the instructions subsequent to this conditional branch instruction is commenced.

A control method of the skipping process operation control unit 322 functioning as the skipping process operation control means is similar to the sequential operations as explained in the fourth embodiment, and a total cycle number in the case that the process operation is not branched (namely, instruction is executed) is made equal to a total cycle number in the case that the process operation is branched (namely, instruction is invalidated).

Also, in accordance with the program control method of this fifth embodiment, an instruction for commencing the skipping process operation is no longer required, so that a total instruction number can be reduced. In other words, since the skipping process operation is commenced by executing the conditional branch instruction, a total instruction number may be reduced, as compared with the skip instructions. Also, no instruction for executing the skipping process operation is required to be installed.

On the other hand, while the skipping process operation control unit 322 is provided as the CPU (processor) with the skip state flag (322*a*) for controlling the data writing operation by the instruction, the skip state flag (322*a*) is set to the skip state in such a case that the condition in the conditional branch instruction can be established. As a consequence, the skipping process operation control unit 322 may become suitable as the separate arrangement which sets the skip state flag.

Sixth Embodiment

Next, a sixth embodiment of the present invention will now be described by mainly considering a different point with respect to the above-explained fifth embodiment.

Figure 20:
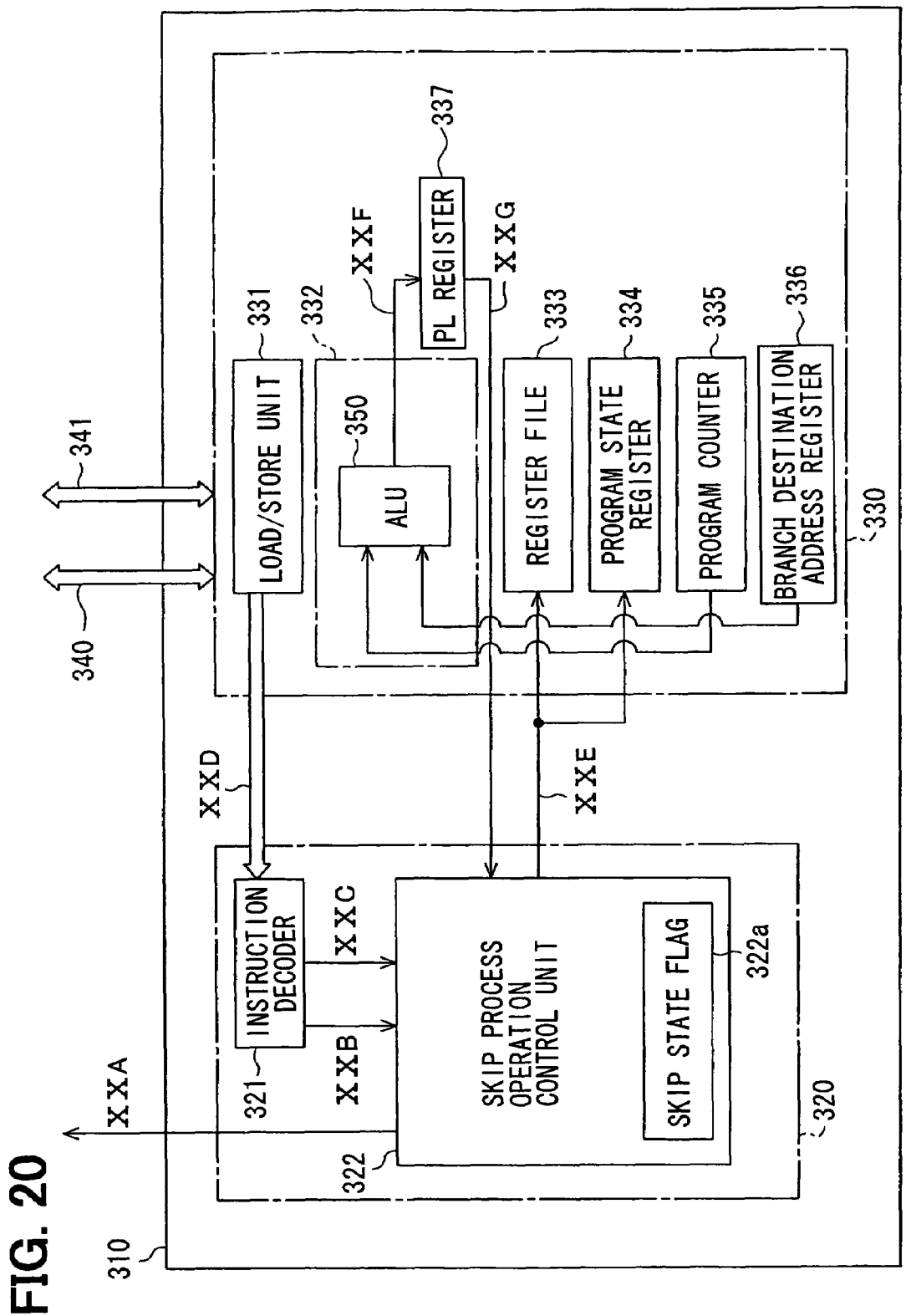
FIG. 20 is a block diagram showing a CPU of a microcomputer according to a sixth embodiment of the present invention.

FIG. 20 is a block diagram for indicating an internal arrangement of a CPU according to this sixth embodiment, which may be replaced by that of FIG. 15. Here, in FIG. 20, XXA represents "EXTERNAL WRITING CONTROL SIGNAL," XXB represents "WRITE CONTROL SIGNAL," XXC represents "SKIP PROCESS OPERATION START SIGNAL," XXD represents "FETCH DATA," XXE represents "INTERNAL WRITE CONTROL SIGNAL," XXF represents "SKIP PROCESS OPERATION END SIGNAL I," XXG represents "SKIP PROCESS OPERATION END SIGNAL II." XXG is delayed by one cycle compared with XXF.

Figure 21:
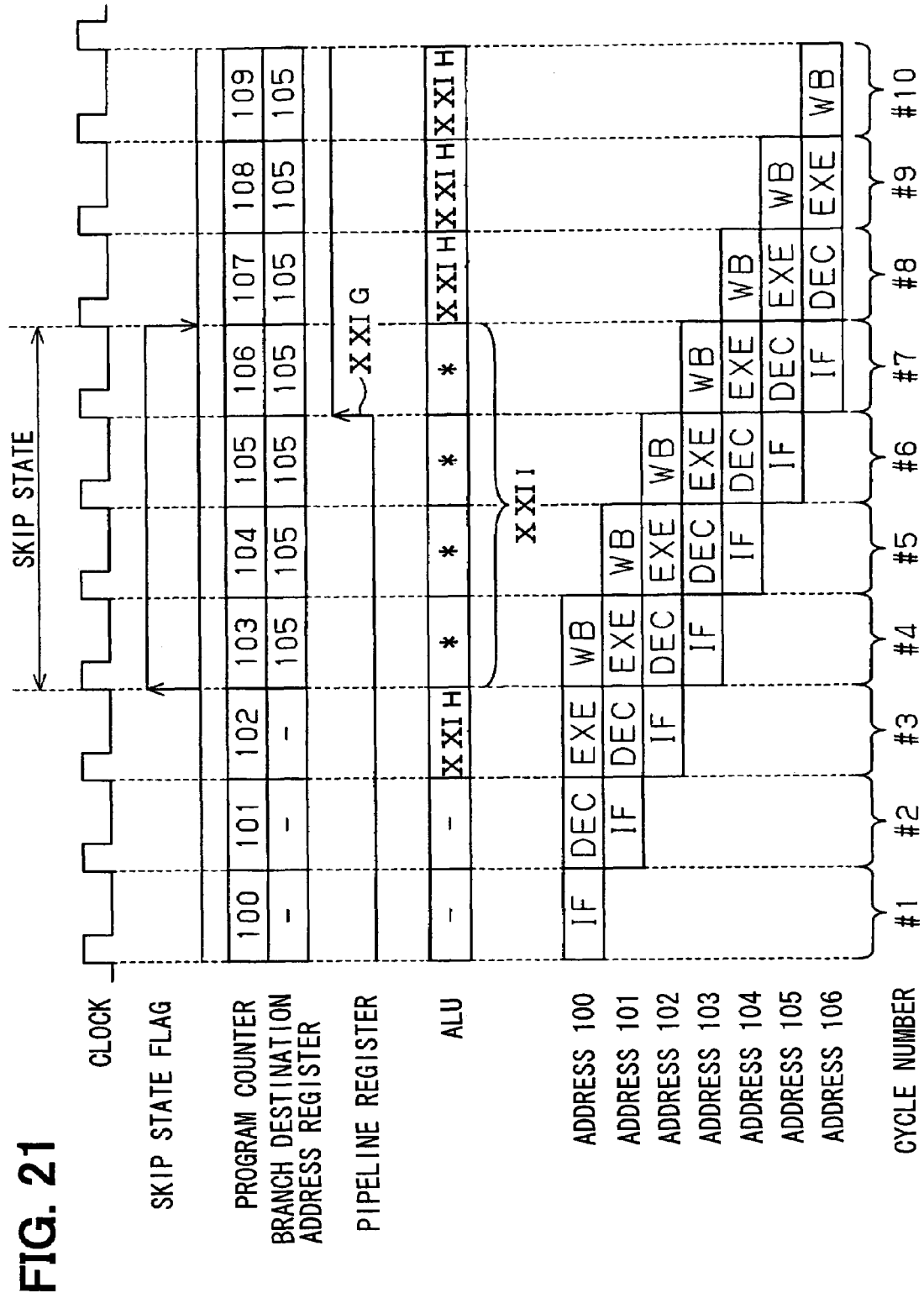
FIG. 21 is a timing chart showing a case of pipeline execution of a skip process in the CPU, according to the sixth embodiment.

FIG. 21 indicates a pipeline operation diagram as to a skipping process operation of this sixth embodiment, which may be replaced by that of FIG. 18. Here, in FIG. 21, "PIPELINE REGISTER" means a skip process operation end signal I, "ALU" means a content of usage of ALU, "ADDRESS 100" means a conditional branch instruction, "ADDRESS 101" to "ADDRESS 104" mean instructions XXIA to XXID, which are objects of skipping operation, "ADDRESS 105" and "ADDRESS 106" mean instructions XXIE and XXIF, XXIG represents a rising edge caused by establishing condition of: PROGRAM COUNTER BRANCH DESTINATION ADDRESS COUNTER, XXIH represents "INSTRUCTION," i.e., usage by an instruction, and XXII represents a comparing operation between program counter and branch destination address register.

In the fifth embodiment, as the means for resetting the skip state flag to the normal state, the sixth embodiment employs the below-mentioned means:

That is, similar to the above-described CPU 310 of the fourth embodiment, as represented in FIG. 20, a CPU 310 has equipped with a skipping process control unit 322. In the case that a condition can be established based upon a condition judgement, the skipping process control unit 322 invalidates either one instruction or a plurality of continuous instructions subsequent to the establishment.

The CPU 310 executes a program in a pipeline process operation which is constituted by five sorts of stages IF, DEC, EXE, MA, and WA. The CPU 310 is arranged by a control unit 320 and a data path 330. The data path 330 is used to store data, and to execute an arithmetic/logic calculation. The control unit 320 controls the data path 330 in response to an instruction fetched from a memory.

The control unit 320 is arranged by both an instruction decoder 321 and a skipping process operation control unit 322. The instruction decoder 321 stores thereinto an instruction fetched from the memory, and decodes the fetched instruction. The skipping process operation control unit 322 judges whether or not the present state corresponds to a skip state based upon both a skipping process operation start signal which is outputted from the instruction decoder 321 and a skipping process operation end signal which is outputted from the data path 330, and thus, controls a writing operation of data with respect to an internal unit and an external unit of the CPU 310. The skipping process operation end signal corresponds to a second skipping process operation end signal "II."

The data path 330 is constituted by a load/store unit 331, an executing unit 332, a register file 333, a program state register 334, a program counter 335, a branch destination address register 336, and a pipeline register 337. The load/store unit 331 controls to read data from an external unit of the CPU 310, and also to write data into the external unit. The executing unit 332 executes a predetermined arithmetic/logic calculation in accordance with an instruction decoded by the instruction decoder 321 in response to a control signal outputted from the control unit 320. In this case, the execution unit 332 owns an ALU (arithmetic logic unit) 350, and the ALU 350 is used also when a skipping process operation is carried out. The register file 333 stores thereinto either data obtained by being executed by the executing unit 332 or data which is acquired from an external unit of the CPU 310 such as the memory. The program state register 334 holds therein a processed state of the CPU 310. The program counter 335 indicates an address of an instruction which is fetched. The branch destination address register 336 holds therein a branch destination address contained in a conditional branch instruction. While a condition code signal corresponding to an output signal of the executing unit 332 (ALU 350) is defined as a first skipping process operation end signal "I", the pipeline register 337 delays the first skipping process operation end signal "I" by one cycle, and then, outputs this delayed end signal to the skipping process control unit 322 as the second skipping process operation end signal "II."

Also, a bus connection of this CPU 310 is constructed in a similar manner to that of the above-explained CPU 310 of the fourth embodiment, namely a bus architecture is arranged in a Neumann structure.

In this sixth embodiment, a skipping process operation control means is constituted by the skipping process operation control unit 322 and the data path 330.

A description is made of a sequential operation for a skipping process operation executed in the above-explained CPU structure with reference to FIG. 20 and FIG. 21.

While the skipping process operation control unit 322 is provided with a skip state flag 322a similar to the fifth embodiment, in the case that the skip state flag 322a is a skip state, the skipping process control unit 322 outputs a write prohibit signal as a write control signal for internal and external units of the CPU 310.

Similar to the fifth embodiment, the skip state flag 322a is set to a skip state in such a case that a conditional branch instruction is decoded by the instruction decoder 321, and the skipping process operation control unit 322 receives a skipping process operation start signal which is outputted when a condition can be established.

In such a case that the skipping process operation start signal is inputted to the skipping process operation control unit 322 in this sixth embodiment, a branch destination address calculated by the executing unit 332 is simultaneously stored in the branch destination address register 336.

Also, while the skip state flag is under the skip state, the skipping process operation control unit 322 of this sixth embodiment controls the executing unit 332 so as to perform comparison operation the branch destination address of the branch destination address register 336 with a present address of the program counter 335. Specifically, both the branch destination address of the branch destination address register 336 and the present address of the program counter 335 are inputted to the ALU (arithmetic logic unit) 350 employed in the executing unit 332, and then, the skipping process operation control unit 322 instructs the executing unit 332 for a comparing operation. A skipping process operation section by the conditional branch instruction (namely, conditional branch instruction for permitting that process operation is branched only to forward routine) is defined from an instruction subsequent to the conditional branch instruction up to one address before the branch destination address. As a result, at such a time instant when [branch destination address of branch destination address register 336]=[present address of program counter 335], the skip state flag may be reset. In this arrangement, the condition code signal corresponding to the output of the executing unit 332 (ALU 350) constitutes the first skipping process operation end signal "I".

In the case of a CPU which executes a pipeline process operation made by a plurality of stages, since there is a shift between writing timing of a calculation result and a value (address) of the program counter 335, such a signal which is delayed by the pipeline register 337 for a timing adjustment purpose is defined as the second skipping process operation end signal "II." In this case, the pipeline register 337 delays the signal by one cycle. As a consequence, only the data writing operation can be prohibited until one instruction before the branch destination address (namely, same cycle number as that when instruction is valid can be consumed).

The reason why this sixth embodiment employs such an arrangement that the comparison between the address of the program counter 335 and the address of the branch destination address register 336 is processed by the executing unit 332 is to achieve a compactness effect of the CPU 310 since the calculator is commonly operated. Since the instruction becomes invalid while the skip state flag is under the skip state, the executing unit 332 can be effectively utilized to perform the comparison operation between the branch destination address of the branch destination address register 336 and the present address of the program counter 335.

Referring now to FIG. 21, such operations that the skip state flag is set and reset by receiving a conditional branch instruction will be explained in detail.

A conditional branch instruction (namely, conditional branch instruction for permitting that process operation is branched only to forward routine) whose address on the memory is located at an address 100 is fetched at timing of a cycle number #1, and then, is executed at timing of a cycle number #3. At the cycle number #3, a condition judging operation is carried out, and when the condition can be established, a skipping process operation start signal is outputted by the instruction decoder 321, and the skip state flag is set at timing of a cycle number #4. At the same time, a branch destination address (in this case, address is "105") is set to the branch destination address register 336.

When the skip state flag is set to the skip state, a data writing operation is prohibited from an instruction present in an EXE stage at this timing, so that the data writing operation as to an instruction "XXIA" shown in FIG. 21 is prohibited. Also, while the skip state flag is under the skip state, the executing unit 332 executes the comparing operation between the address of the program counter 335 and the address of the branch destination address register 336. At timing of a cycle number #6 when [present address of program counter]≧[address of branch destination address register], the first skipping process operation end signal I is outputted. In connection to this signal output, the first skipping process operation end signal I is delayed by only one cycle by the pipeline register 337, and the skip state flag is reset. In other words, the skip state flag is set up to a cycle number #7, and then, is reset at a cycle number #8.

As to an instruction "XXIE" corresponding to such an instruction whose address is 105, the EXE stage becomes at timing of the cycle number #8 where the skip state flag is reset to the normal state, so that a data writing operation after this instruction "XXIE" may again become effective.

As previously explained, in the CPU 310 of this sixth embodiment, the skipping process control operation can be realized without employing such an instruction which is dedicated for the skipping process operation. Furthermore, since the hardware resource is effectively utilized, the CPU 310 can be made in a compact structure.

Also, in accordance with the program control method of this sixth embodiment, an instruction for ending the skipping process operation is no longer required, so that a total instruction number can be reduced. Furthermore, the flag setting operation is carried out when the condition can be established in the conditional branch instruction, and also, the flag resetting operation is carried out by comparing the addresses with each other. As a result, the instructions for commencing and ending the skipping process operation are no longer required, so that a total instruction number can be reduced. In addition, there is another effect to avoid such a work that a programmer grasps a position within a program where an instruction is valid, or invalid, and embeds a necessary instruction in this program.

As previously explained, the sixth embodiment owns the following feature:

That is, as the program control method, the skipping process operation is accomplished by such a fact as a trigger that a relationship between the branch destination address and the present address of the program counter 35 becomes "branch destination address≧present address", while the branch destination address is designated by the conditional branch instruction for permitting that the process operation is branched only to the forward routine. As a consequence, a total instruction number of this program control method can be made smaller than that of such a case that the skip invalid instruction is inserted in the program. Also, such an instruction for executing a skipping process operation is not provided in the program.

As the CPU (processor), the skipping process operation control means (322, 330) is equipped with the branch destination address register 336 and the ALU (arithmetic logic unit) 350 functioning as the address comparing means, and the ALU 350 resets the skip state flag to the normal stage based upon such a fact as a trigger that the branch destination address becomes larger than, or equal to the present address. The branch destination address register 336 is used so as to hold the branch destination address which is designated by the conditional branch instruction. The ALU 350 compares the branch destination address held in the branch destination address register 336 with the present address of the program counter 335. As a result, the skipping process control means (322, 330) may become suitable as a separate structure for resetting the skipping state flag.

Also, the address comparing means is constituted by the ALU (arithmetic logic unit) 350 employed inside the data path 330. In the case that the skip state flag has been set to the skip state, both the branch destination address of the branch destination address register 336 and the present address of the program counter 335 are inputted to the ALU 350. In response to the condition code outputted from the ALU 350, namely such a fact as a trigger that the comparison result becomes "branch destination address becomes larger than, or equal to present address", the ALU 350 resets the skip state flag to the normal state. As a consequence, the ALU 350 provided inside the data path 330 is employed as the structure capable of comparing the branch destination address of the branch destination address register 336 with the present address of the program counter 335, so that the CPU (processor) can be made compact since the resource is effectively utilized.

Seventh Embodiment

Next, a seventh embodiment of the present invention will now be described by mainly considering a different point with respect to the above-explained sixth embodiment.

Figure 22:
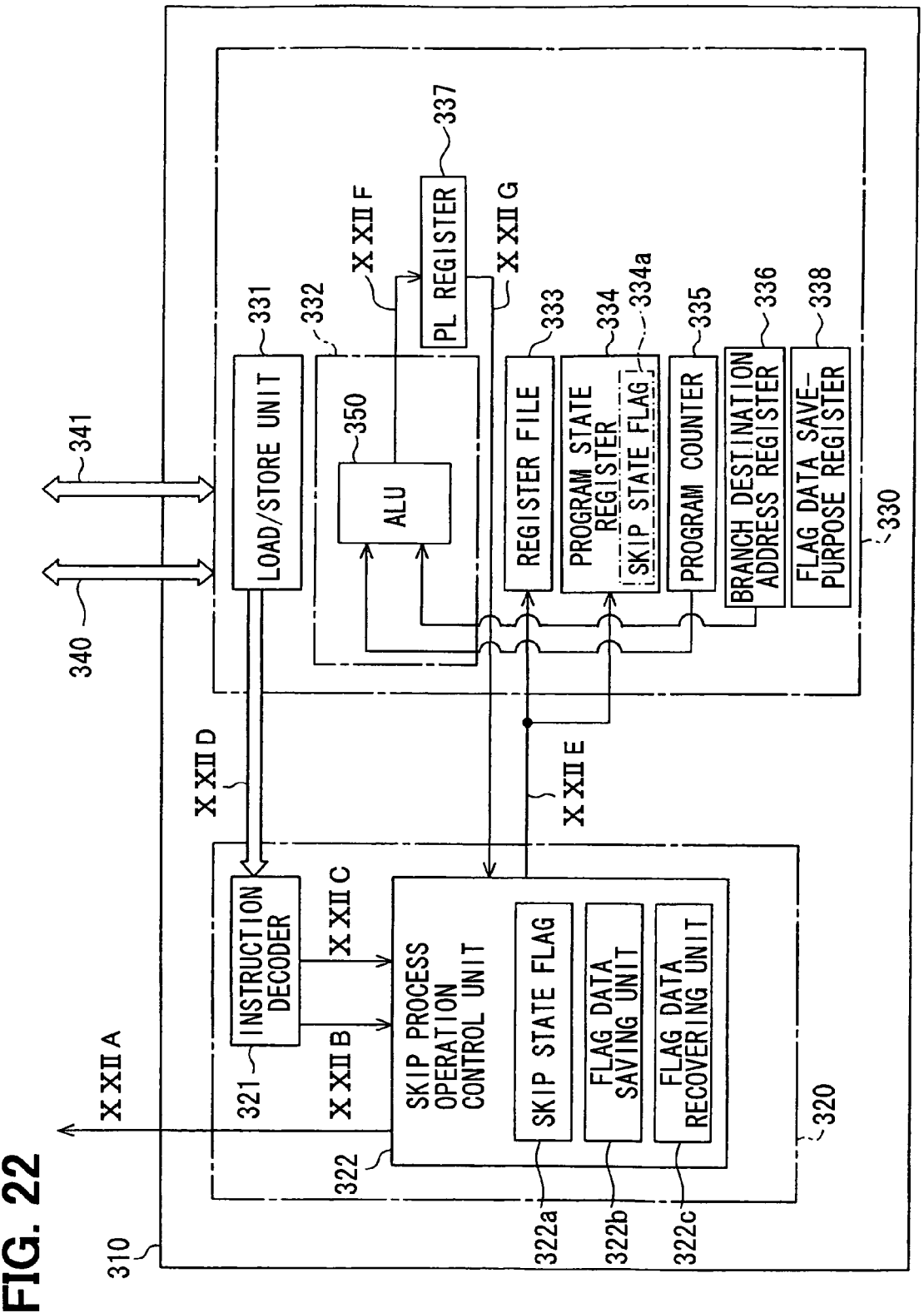
FIG. 22 is a block diagram showing a CPU of a microcomputer according to a seventh embodiment of the present invention.

FIG. 22 is a block diagram for indicating an internal arrangement of a CPU according to this seventh embodiment, which may be replaced by that of FIG. 20. Here, in FIG. 22, XXIIA represents "EXTERNAL WRITING CONTROL SIGNAL," XXIIB represents "WRITE CONTROL SIGNAL," XXIIC represents "SKIP PROCESS OPERATION START SIGNAL," XXIID represents "FETCH DATA," XXIIE represents "INTERNAL WRITE CONTROL SIGNAL," XXIIF represents "SKIP PROCESS OPERATION END SIGNAL I," XXIIG represents "SKIP PROCESS OPERATION END SIGNAL II." XXIIG is delayed by one cycle compared with XXIIF.

Figure 23:
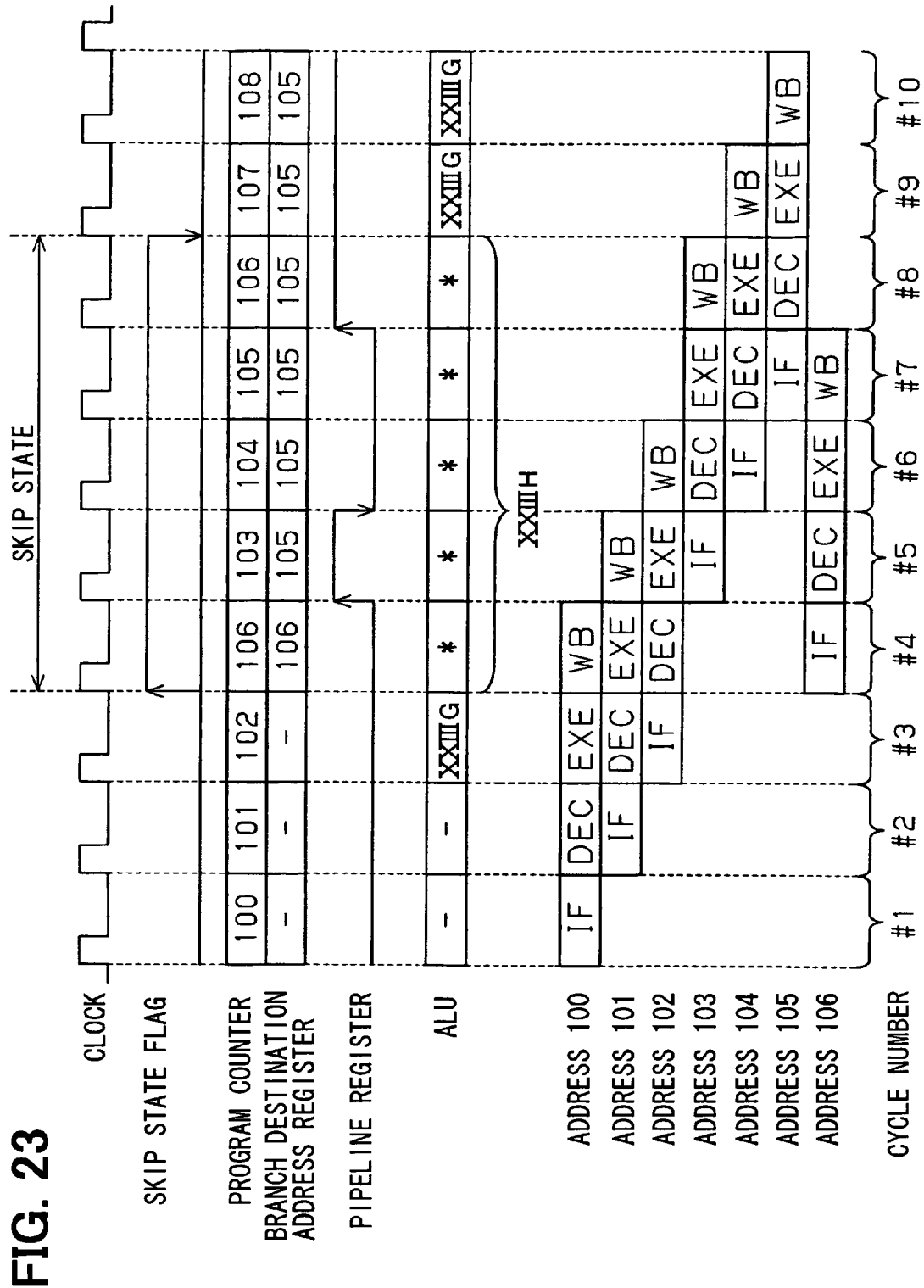
FIG. 23 is a timing chart showing a case of pipeline execution of a skip process in the CPU, according to the seventh embodiment.

FIG. 23 indicates a pipeline operation diagram as to a skipping process operation of this seventh embodiment, which may be replaced by that of FIG. 21. Here, in FIG. 23, "PIPELINE REGISTER" means a skip process operation end signal I, "ALU" means a content of usage of ALU, "ADDRESS 100" means a conditional branch instruction, "ADDRESS 101" to "ADDRESS 104" mean instructions XXIIIA to XXIIID, which are objects of skipping operation, "ADDRESS 105" and "ADDRESS 106" mean instructions XXIIIE and XXIIIF, XXIIIG represents "INSTRUCTION," i.e., usage by an instruction, and XXIIIH represents a comparing operation between program counter and branch destination address register. Between the "ADDRESS 102" and the "ADDRESS 103," occurrence of interrupt is disposed.

In FIG. 22, a skipping process control unit 322 is equipped with a skip state flag 322a, a flag data saving unit 322b functioning as a flag data saving means, and a flag data recovering unit 322c functioning as a flag data recovering means. Also, a flag data save-purpose register 338 is provided in a data path 330.

In this seventh embodiment, a skipping process operation control means is arranged by the skipping process control unit 322 and the data path 330.

With employment of this structure, the skipping process operation control means is operated as follows:

That is, in FIG. 23, this skipping process operation is assumed to be performed by that after a conditional branch instruction (namely, conditional branch instruction for permitting that process operation is branched only to forward routine) whose address corresponds to an address "100", an instruction "XXIIIA" whose address corresponds to an address "101"; an instruction "XXIIIB" whose address corresponds to an address "102"; an instruction "XXIIIC" whose address corresponds to an address "103"; and an instruction "XXIIID" whose address corresponds to an address "104" are skip-processed. Furthermore, an interrupt is issued between the instruction "XXIIIB" whose address corresponds to an address "102" and the instruction "XXIIIC" whose address corresponds to an address "103", and another instruction "XXIIIF" whose address corresponds to an address "106", and thereafter, the process operation is returned.

The skip state flag is set in response to the conditional branch instruction (namely, conditional branch instruction for permitting that process operation is branched only to forward routine), and thereafter, when an interrupt is issued, the flag data saving unit 322b of the skipping control unit 322 saves the flag data of the skip state flag to the register 338. Also, since the interrupt is issued, "106" is set as an address to both the program counter 335 and the branch destination address register 336 (namely, condition of branch destination address≧present address can be established).

In response to a recovery instruction issued after the interrupt process operation is accomplished, the flag data recovering unit 322c of the skipping process control unit 322 recovers the flag data saved in the register 338 to a skip state flag. Also, in order to process the instruction "XXIIIC" whose address corresponds to the address "103" in connection with the completion of the interrupt process operation, "103" is set as an address to the program counter 335 (namely, "105" is set as address to branch destination address register 336, so that branch destination address>present address).

Thereafter, in a cycle number #7, the branch destination address of the branch destination address register 336 becomes "105", and the present address of the program counter 335 becomes "105", namely, the branch destination address becomes equal to the present address. In the next cycle, the skip state flag is reset (namely, skipping process operation is ended).

As previously explained, the process operations are switched by the interrupt process operation, and even when the process operation is restarted in response to the return instruction, the skipping process operation can be continuously carried out.

Figure 24:
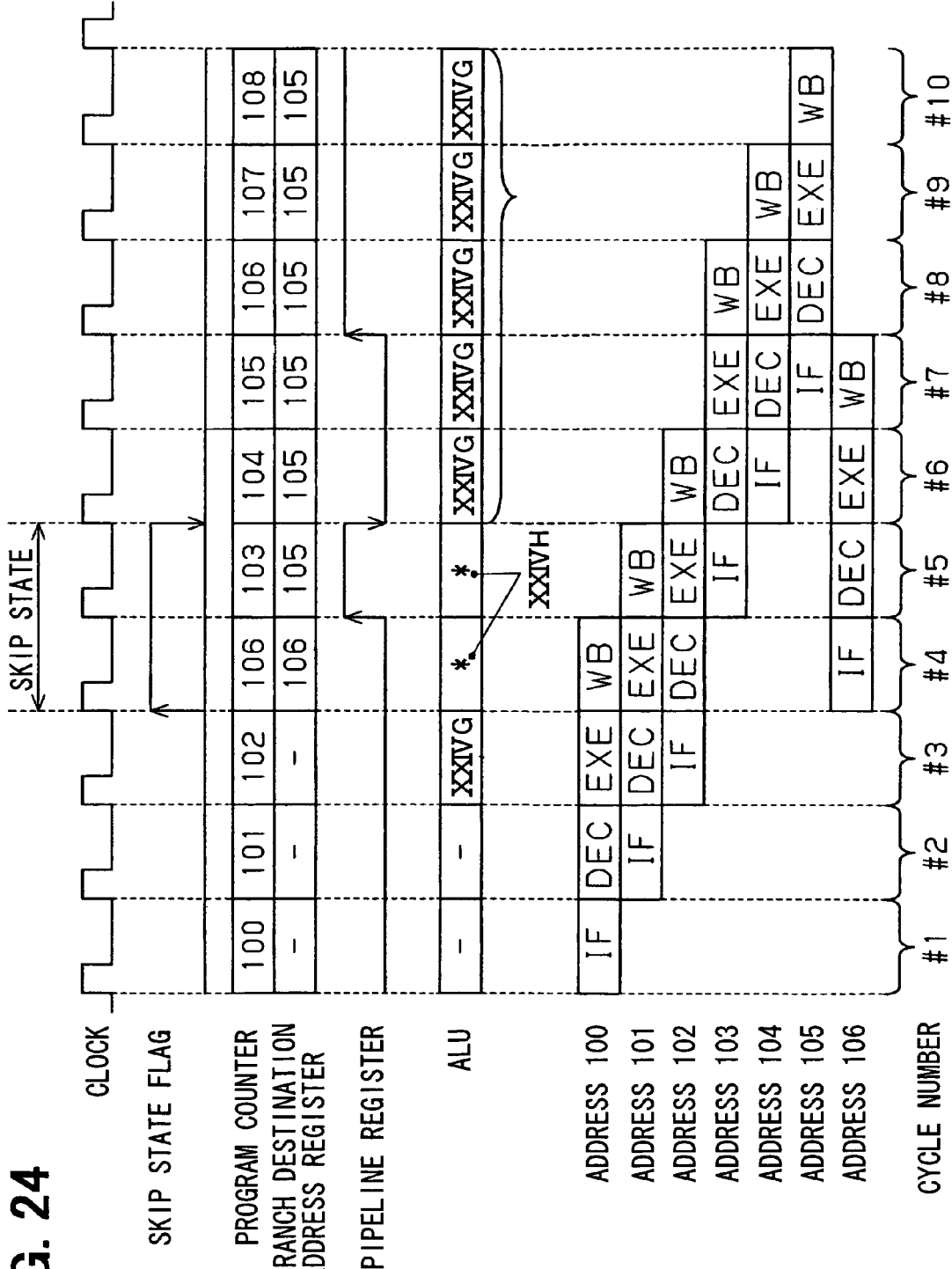
FIG. 24 is a timing chart showing a case of pipeline execution of a skip process in the CPU, according to a comparison of the seventh embodiment.

In this case, a description is made of such a case that the above-explained flag data saving unit 322b, the flag data recovering unit 322c, and the flag data save-purpose register 338 may be not provided with reference to FIG. 24. Here, in FIG. 24, "PIPELINE REGISTER" means a skip process operation end signal I, "ALU" means a content of usage of ALU, "ADDRESS 100" means a conditional branch instruction, "ADDRESS 101" to "ADDRESS 104" mean instructions XXIVA to XXIVD, which are objects of skipping operation, "ADDRESS 105" and "ADDRESS 106" mean instructions XXIVE and XXIVF, XXIVG represents "INSTRUCTION," i.e., usage by an instruction, and XXIVH represents a comparing operation between program counter and branch destination address register. Between the "ADDRESS 102" and the "ADDRESS 103," occurrence of interrupt is disposed.

That is, in FIG. 24, after the skip state flag has been set by the conditional branch instruction (namely, conditional branch instruction for permitting that process operation is branched only to forward routine), even when an interrupt is issued, saving of the flag data of the skip state flag is not carried out. Under this condition, since the interrupt is issued, "106" is set to both the program counter 335 and the branch destination address register 336 as the addresses, and since the condition as to this branch destination address≧the present address can be established, the skip state flag is reset.

When the interrupt process operation is accomplished, in order to process the instruction "XXIIIC" whose address corresponds to the address "103", "103" is set as an address to the program counter 335, and also, "105" is set as address to branch destination address register 336, so that the branch destination address becomes larger than the present address. However, since the resetting operation for the skip state flag is already accomplished, the skipping process operation cannot be continued.

To the contrary, in accordance with this seventh embodiment, there is no possibility that the skip state flag is reset by the interrupt.

It should also be noted that the data of the skip state flag may not be saved in the flag data save-purpose register 338 of FIG. 22, but may be alternatively saved to a memory outside the CPU 10.

It should also be understood that the skip state flag 322a shown in FIG. 22 may not be provided in the control unit 320, but may be alternatively provided as a skip state flag 334a in the program state register 334 of the data path 330.

As previously explained, this seventh embodiment owns the following feature:

That is, as the CPU (processor), the skipping process control means (322, 330) is equipped with the flag data saving unit 322b and the flag data recovering unit 322c. This flag data saving unit 322b saves the flag data of the skip state flag 322a to either the register 338 or the memory when the interrupt is issued. The flag data recovering unit 322c recovers the saved flag data to the skip state flag 322a in response to the recovery instruction. As a result, the skipping process operation when the interrupt is issued can be continuously performed. This structure may be applied to the fourth embodiment.

Although the sequence control operation has been carried out in the pipeline mode in the previous embodiments, the present invention is not limited only thereto.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A microcomputer comprising:
   a CPU configured to perform a plurality of tasks in a parallel time-sharing operation,
   the tasks including at least one special task having a fixed loop program with a constant increase of an instruction address; and
   a skip judging circuit configured to output a write prohibit signal to the CPU for a predetermined time period indicating that the CPU executes instructions but does not utilize the execution result of the instructions,
   wherein, when the instruction address in the fixed loop program overflows, the instruction address is reset to an initial address, and the instruction address starts to increase from the initial address,
   the CPU being further configured so that, when the CPU performs a conditional branch instruction in the special task, the conditional branch instruction located at a conditional branch instruction address, the conditional branch instruction including a branch destination address, one or more instructions located at one or more instruction addresses between the conditional branch instruction address and the branch destination address and when it is determined in the conditional branch instruction that a result of a condition judging process in the conditional branch instruction is that execution should proceed to the branch destination address, the skip judging circuit outputs the write prohibit signal to the CPU so that the CPU executes the one or more instructions but is adapted to perform an invalidation step that prohibits utilizing the execution result of the one or more instructions in both the CPU and a periphery circuit, and a process time for a case where the result of the condition judging process is that execution should proceed to the branch destination address for performing the invalidation step is substantially equal to a process time for a case where the result of the condition judging process is that execution should proceed to the one or more instruction addresses just after the conditional branch instruction address, wherein, when it is determined in the conditional branch instruction that a result of the condition judging process in the conditional branch instruction is that execution should not proceed to the branch destination address, the CPU executes the one or more instructions located at instruction addresses between the conditional branch instruction address and the branch destination address and the skip judging circuit does not output the write prohibit signal.

2. The microcomputer according to claim 1, wherein when the instruction after the conditional branch instruction is a load instruction, and when the result of the condition judging process is that execution should proceed to the branch destination address, the CPU executes the load instruction but performs the invalidation step that prohibits writing a load execution result data in an inner register, and the data is read out by execution of the load instruction.

3. The microcomputer according to claim 1, wherein when the instruction after the conditional branch instruction is a calculation instruction, and when the result of the condition judging process is that the execution should proceed to the branch destination address, the CPU executes the calculation instruction but performs the invalidation step that prohibits writing a calculation execution result data in an inner register, and the data is obtained by execution of the calculation instruction.

4. The microcomputer according to claim 1, wherein when the instruction after the conditional branch instruction is a load instruction, and when the result of the condition judging process is that the execution should proceed to the branch destination address, the CPU executes the load instruction but performs the invalidation step in such a manner that a data is replaced to a predetermined value in an inner register so as to write the predetermined value in the inner register when the data read out by execution of the load instruction is to be written in the inner register.

5. The microcomputer according to claim 1, wherein when the instruction after the conditional branch instruction is a calculation instruction, and the result of the condition judging process is that the execution should proceed to the branch destination address, the CPU executes the calculation instruction but performs the invalidation step in such a manner that a data is replaced to a predetermined value in an inner register so as to write the predetermined value in the inner register when the data obtained by execution of the calculation instruction is to be written in the inner register.

6. The microcomputer according to claim 1, wherein when the instruction after the conditional branch instruction is a store instruction, and when the result of the condition judging process is that the execution should proceed to the branch destination address, the CPU executes the store instruction but performs the invalidation step that converts an operand address in the store instruction to a dummy address so that the CPU outputs the dummy address, the dummy address has no object, in which a data is to be written, and the periphery circuit returns an acknowledge signal to the CPU when execution of the dummy address provides to access the periphery circuit.

7. The microcomputer according to claim 6, wherein when the operand address in the store instruction is converted to the dummy address, each low-order bit by a predetermined number of the low-order bits in the operand address is converted to "1."

8. The microcomputer according to claim 6, wherein when the operand address in the store instruction is converted to the dummy address, the CPU adds a predetermined address value to the operand address.

9. A microcomputer comprising:

a CPU configured to perform a plurality of tasks in a parallel time-sharing operation, the tasks including at least one special task having a fixed loop program with a constant increase of an instruction address, and the CPU including a program counter and a general purpose register; and a skip judging circuit for outputting a write prohibit signal to the program counter and the general purpose register in the CPU for a predetermined time period indicating that the CPU executes instructions but does not utilize the execution result of the instructions, wherein, when the instruction address in the fixed loop program overflows, the instruction address is reset to an initial address, and the instruction address starts to increase from the initial address, wherein the program counter counts the instruction address, and the general purpose register stores an execution result of an instruction in the instruction address, wherein the special task includes a conditional branch instruction located at a conditional branch instruction address, wherein the conditional branch instruction provides a branch destination address, wherein, when it is determined in the conditional branch instruction that a result of a condition judging process in the conditional branch instruction provides to proceed to an instruction address next to the conditional branch instruction address, the CPU executes one or more instructions located at instruction addresses between the conditional branch instruction address and the branch destination address, wherein, when it is determined in the conditional branch instruction that the result of the condition judging process in the conditional branch instruction provides to proceed to the branch destination address, the skip judging circuit outputs the write prohibit signal to the program counter and the general purpose register so that the CPU executes the one or more instructions but is adapted to perform an invalidation step that prohibits utilizing the execution result of the one or more instructions in both the CPU and a periphery circuit, and a process time for a case where the result of the condition judging process provides to proceed to the branch destination address is substantially equal to a process time for a case where the result of the condition judging process provides to proceed to the instruction address next to the conditional branch instruction address, wherein, when it is determined in the conditional branch instruction that a result of the condition judging process in the conditional branch instruction is that execution should not proceed to the branch destination address, the CPU executes the one or more instructions located at instruction addresses between the conditional branch instruction address and the branch destination address and the skip judging circuit does not output the write prohibit signal.

* * * * *